United States Patent
Williams et al.

(10) Patent No.: US 10,496,878 B2
(45) Date of Patent: Dec. 3, 2019

(54) INFORMATION PROCESSING APPARATUS, METHOD AND COMPUTER PROGRAM PRODUCT

(71) Applicant: Sony Corporation, Tokyo (JP)

(72) Inventors: Michael John Williams, Winchester (GB); William Jack Leathers-Smith, Guildford (GB); Paul Edward Prayle, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/594,740

(22) Filed: May 15, 2017

(65) Prior Publication Data
US 2018/0018510 A1  Jan. 18, 2018

(30) Foreign Application Priority Data
Jul. 15, 2016  (GB) .................................. 1612323.4

(51) Int. Cl.
*G06K 9/00* (2006.01)
*G06K 9/62* (2006.01)
(Continued)

(52) U.S. Cl.
CPC ..... *G06K 9/00348* (2013.01); *G06K 9/00744* (2013.01); *G06K 9/6215* (2013.01);
(Continued)

(58) Field of Classification Search
None
See application file for complete search history.

(56) References Cited

U.S. PATENT DOCUMENTS

| | | | |
|---|---|---|---|
| 6,724,915 B1* | 4/2004 | Toklu | G06T 7/248 382/103 |
| 6,763,390 B1* | 7/2004 | Kovacevic | H04N 21/23608 348/E5.005 |

(Continued)

FOREIGN PATENT DOCUMENTS

| | | |
|---|---|---|
| EP | 3 086 320 A1 | 10/2016 |
| GB | 2539312 A | 12/2016 |

OTHER PUBLICATIONS

M. Mancas et al., "Tracking-Dependent and Interactive Video Projection," Proc. Fourth Int'l Summer Workshop Multi-Modal Interfaces, pp. 73-83, 2009.*

(Continued)

*Primary Examiner* — Soo Shin
(74) *Attorney, Agent, or Firm* — Oblon, McClelland, Maier & Neustadt, L.L.P.

(57) ABSTRACT

An information processing apparatus, comprising: receiver circuitry configured to receive i) a video stream comprising a plurality of images, each image containing at least one object located at a position in a plane and the image having associated image timing information indicating its temporal position in the video stream and ii) a stream of object tracking information each having associated object timing information indicating its temporal position in the stream of object tracking information wherein the stream of object tracking information corresponds to the video stream and separately defines the position of the object in the plane captured in each image in the video stream; and controller circuitry configured to perform pattern matching on the position of each of the objects in the video stream and the object tracking information, and when there is a closest matching position, synchronising the image timing information and the object timing information.

20 Claims, 34 Drawing Sheets

(51) Int. Cl.
*G06T 7/246* (2017.01)
*G06T 7/38* (2017.01)
*G11B 27/031* (2006.01)
*G11B 27/10* (2006.01)
*G11B 27/34* (2006.01)
*H04N 5/232* (2006.01)

(52) U.S. Cl.
CPC ............. *G06T 7/248* (2017.01); *G06T 7/38* (2017.01); *G11B 27/031* (2013.01); *G11B 27/10* (2013.01); *G11B 27/34* (2013.01); *H04N 5/23296* (2013.01); *G06T 2207/10016* (2013.01); *G06T 2207/30196* (2013.01); *G06T 2207/30224* (2013.01); *G06T 2207/30228* (2013.01)

(56) References Cited

U.S. PATENT DOCUMENTS

| | | | | |
|---|---|---|---|---|
| 6,988,238 | B1* | 1/2006 | Kovacevic | H04L 1/0083 |
| | | | | 348/E5.108 |
| 8,989,006 | B2* | 3/2015 | Jost | H04N 21/23439 |
| | | | | 370/235 |
| 2002/0064764 | A1* | 5/2002 | Fishman | A63B 24/0003 |
| | | | | 434/252 |
| 2004/0240562 | A1* | 12/2004 | Bargeron | H04N 7/165 |
| | | | | 375/240.29 |
| 2013/0300933 | A1* | 11/2013 | Thorson | H04N 21/4307 |
| | | | | 348/500 |
| 2013/0330054 | A1* | 12/2013 | Lokshin | H04N 5/77 |
| | | | | 386/227 |
| 2015/0154452 | A1* | 6/2015 | Bentley | G06K 9/00711 |
| | | | | 386/201 |
| 2015/0318015 | A1* | 11/2015 | Bose | H04N 7/188 |
| | | | | 386/248 |
| 2016/0014305 | A1* | 1/2016 | Schlattmann | G06K 9/00758 |
| | | | | 348/515 |
| 2016/0307371 | A1* | 10/2016 | Ayers | G06T 19/006 |
| 2016/0314818 | A1* | 10/2016 | Kirk | G11B 27/031 |
| 2017/0270354 | A1* | 9/2017 | Painter | G06K 9/00348 |

OTHER PUBLICATIONS

M. Mancas et al., "Tracking-Dependent and Interactive Video Projection," Proc. Fourth Int'l Summer Workshop Multi-Modal Interfaces, pp. 73-83, 2009 (Year: 2009).*
U.S. Appl. No. 15/132,351, filed Apr. 19, 2016, 2016/0379682 A1, Michael John Williams, et al.

* cited by examiner

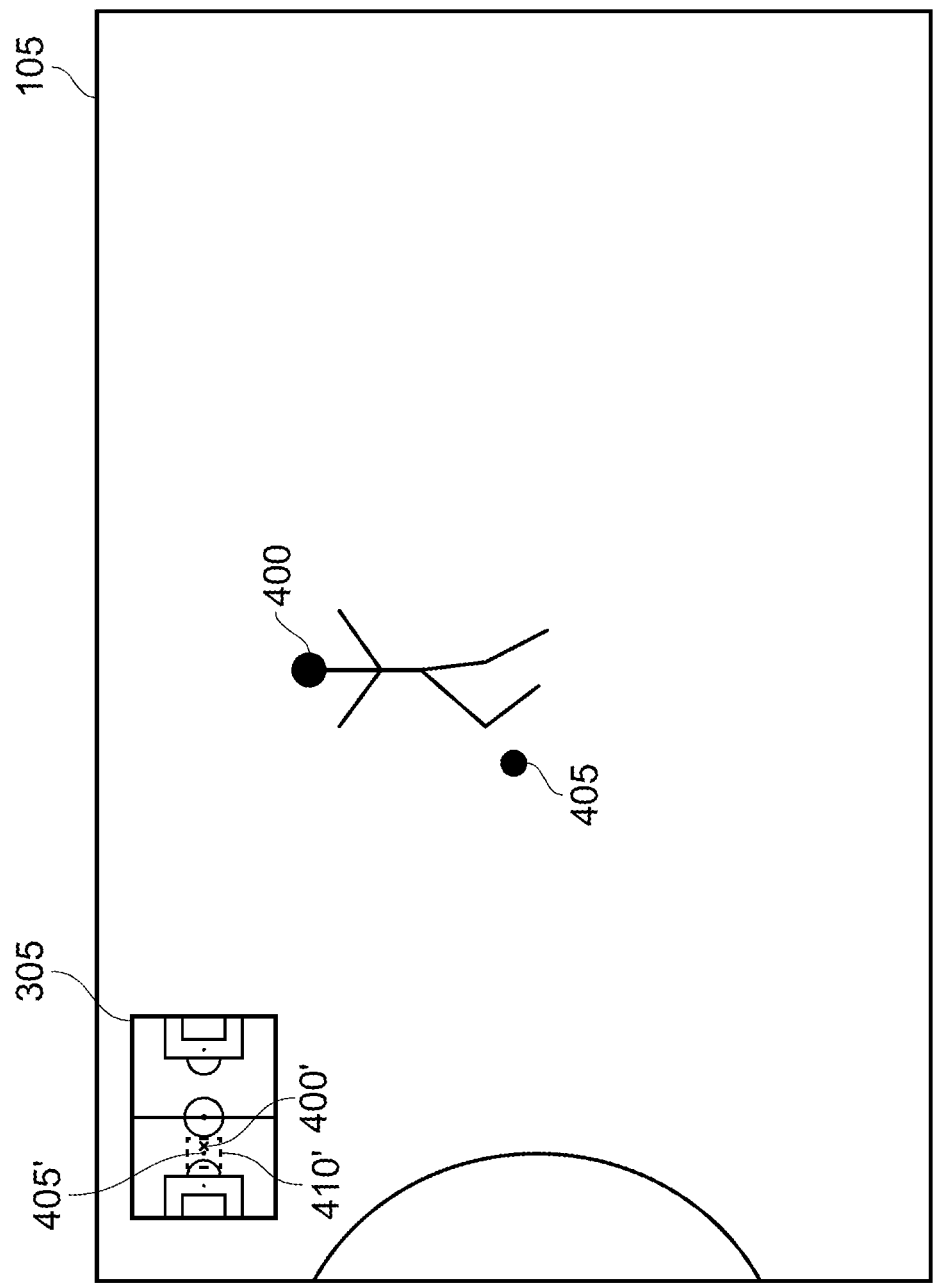

| Start Time | End Time | Identifier |
|---|---|---|
| 00:05:37 | 00:06:14 | Player 1 ~ 800 |
| 00:08:13 | 00:08:43 | Player 2 ~ 802 |
| 00:08:20 | 00:08:49 | Player 3 ~ 804 |
| 00:08:10 | 00:08:52 | Free Kick ~ 806 |
| 00:11:12 | 00:11:33 | Player 2 ~ 808 |
| 00:10:58 | 00:11:41 | Yellow Card ~ 810 |
| . | . | . |
| . | . | . |
| . | . | . |
| . | . | . |

FIG. 8

Time 00:18:15:22

Time 00:18:15:22

Time 00:18:15:22

US 10,496,878 B2

INFORMATION PROCESSING APPARATUS, METHOD AND COMPUTER PROGRAM PRODUCT

CROSS REFERENCE TO RELATED APPLICATIONS

The present application claims priority to United Kingdom Application 1612323.4 filed on 15 Jul. 2016, contents of which being incorporated herein by reference in its entirety.

BACKGROUND

The present disclosure relates generally, but not exclusively, to an information processing apparatus, method and computer program product.

BACKGROUND TO THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Currently, sports teams use recorded video footage to monitor the performance of players. In these systems it is also necessary to monitor the position of players at any one point in time to monitor how quickly a player can run, and whether their position on the sports pitch is appropriate for the scenario. In other words, the sports analysts have one video stream showing the overall pitch with the players running on the pitch and a second stream including the physical position of players on the pitch.

In order to the sports analyst to correctly analyse the performance, the video stream and the positional information stream need to align. However, as these streams are captured using different system, these two streams may not synchronise without manual intervention. It is an aim of the present disclosure to address this issue.

SUMMARY

According to the disclosure, there is provided an information processing apparatus, comprising: receiver circuitry configured to receive i) a video stream comprising a plurality of images, each image containing at least one object located at a position in a plane and the image having associated image timing information indicating its temporal position in the video stream and ii) a stream of object tracking information each having associated object timing information indicating its temporal position in the stream of object tracking information wherein the stream of object tracking information corresponds to the video stream and separately defines the position of the object in the plane captured in each image in the video stream; and controller circuitry configured to perform pattern matching on the position of each of the objects in the video stream and the object tracking information, and when there is a closest matching position, synchronising the image timing information and the object timing information.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Embodiments of the present disclosure will now be described by way of example only and with reference to the accompanying drawings, in which:

FIGS. 4A to 4C show object detection and tracking used in the system of FIG. 1:

FIG. 8 shows data collected at a soccer match according to an embodiment of the present disclosure:

DESCRIPTION OF THE EMBODIMENTS

Figure 1:
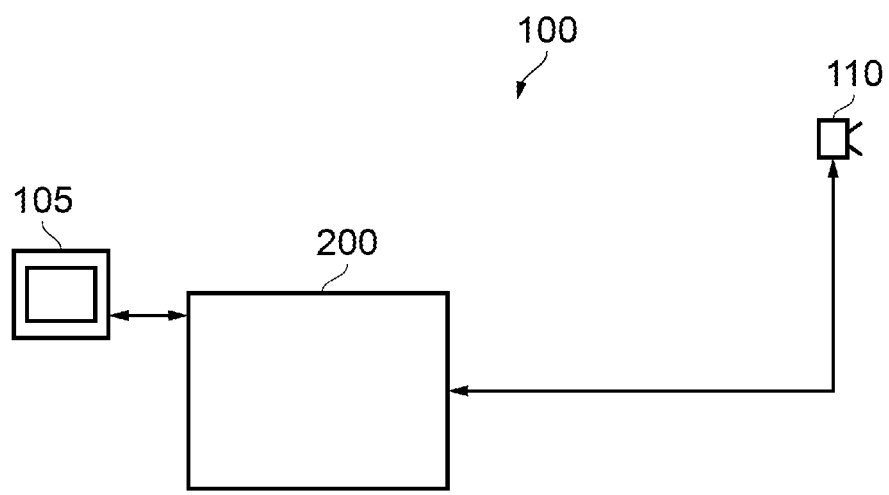
FIG. 1 shows a system according to embodiments of the disclosure.

Referring now to the drawings, wherein like reference numerals designate identical or corresponding parts throughout the several views.

Camera Motion Control

FIG. 1 shows a system 100 according to embodiments of the disclosure. The system 100 includes a terminal 105 connected to an image processing apparatus 200 according to embodiments. The terminal 105 may be connected over a wireless or wired connection. Additionally, the wired or wireless connection may be a direct connection or may be over a network such as a local area network or a wide area network. In embodiments, the terminal 105 may be a personal computer, but may, instead, be a tablet, smartphone or the like.

The image processing apparatus 200 is also connected to a camera arrangement 110. The camera arrangement 110 may be a single camera or may be a cluster of cameras arranged with overlapping fields of view. If the camera cluster arrangement is provided, then a super-high resolution image will be ultimately created. The camera cluster arrangement and the generation of the super-high resolution image is known and is described in GB2473059A, the contents of this document is incorporated in its entirety by reference. However, unlike the disclosure in GB2473059A, in embodiments of the disclosure, the pitch, zoom, and roll of the or each camera will be remotely controlled. In other words, unlike the cameras in GB2473059A which are stationary, the pan, tilt and zoom of the camera or cameras in the present disclosure are remotely controlled. An example of such a suitable camera for the present disclosure is the Sony® BRC-H900.

Figure 2:
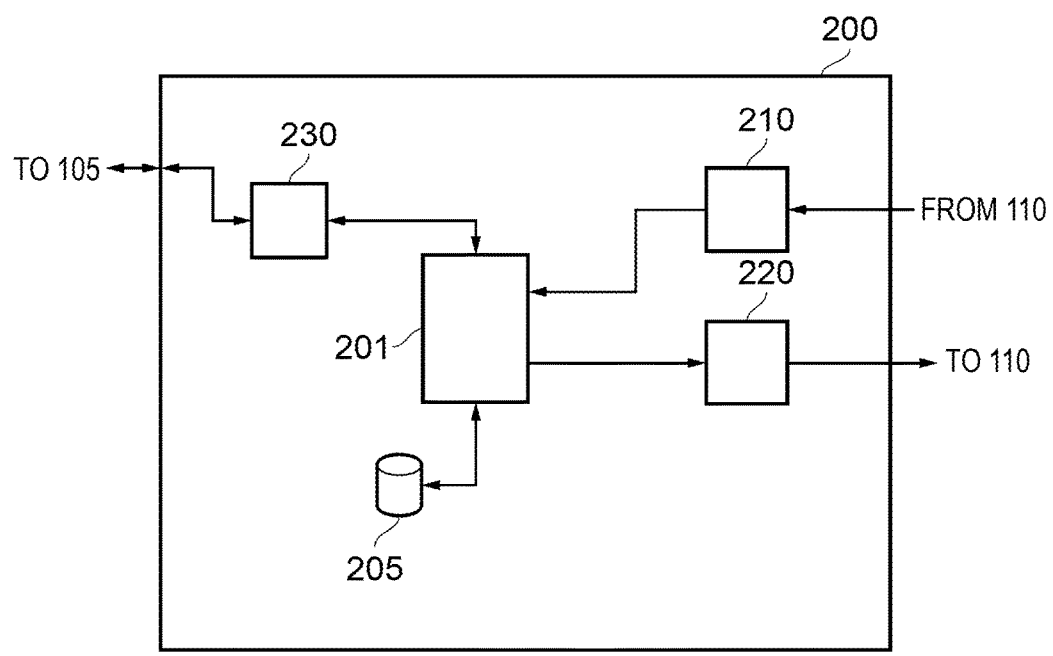
FIG. 2 shows an image processing apparatus according to embodiments of the disclosure.

FIG. 2 shows the image processing apparatus 200 according to embodiments in more detail. The image processing apparatus 200 has an input/output port that is connected to the terminal 105, either directly using a wired or wireless connection or via a network. The input/output port is connected to a terminal connection unit 230 that sends information to the terminal device 105 and receives instructions from the terminal device 105. The terminal connection unit 230 is connected to a processor 201. Of course, although the foregoing has an input/output port, it is envisaged that these may in fact consist of two or more separate ports.

The processor 201 is controlled using computer program code that is stored in a storage unit 205. The computer program code, when loaded onto the processor 201 controls the operation of the processor 201. The storage unit 205 may be semi-conductor storage, magnetic storage or optical storage. As will be apparent later, the storage unit 205 stores the captured video and metadata associated with the video. Other data may be also stored in the storage unit 205 as will be explained.

Also connected to the processor 201 is a camera input unit 210 and a camera output unit 220. The camera input unit 210 receives the image from the or each camera in the camera arrangement 110. The camera output unit 220 controls the pan, tilt and zoom of the or each camera in the camera arrangement 110 and sends instructions to the or each camera in the camera arrangement 110 accordingly.

The camera input unit 210 contains the chromatic aberration corrector, the image alignment means, the virtual projection means, the camera parameter calculation means, the colour correction means, the exposure correction means and the image stitching means of GB2473059A. The function of the camera input unit 210 in a camera arrangement 110 having multiple cameras is to provide firstly a stitched super-high resolution image. However, in addition, the camera input unit 210 maps the pixel position output from each camera in the arrangement into a position on a virtual plane so that a virtual camera view can be produced. The output of the camera input unit 210 which is fed to the processor 201 is therefore a super-high resolution image formed of a plurality of high resolution images. Of course, if the camera arrangement 110 contains a single camera, then no image stitching is required. However, it is still necessary for the camera input unit 210 to map the pixel position output from the camera in the arrangement into a position on the virtual plane so that the virtual camera view can be produced. Therefore, in the case of a single camera in the camera arrangement 110, only the virtual projection means and the camera parameter calculation means is provided in the camera input unit 210.

Also provided to the processor 201 is the current pan, tilt and zoom parameters of each camera in the camera arrangement 110. These values will be used by the processor 201 to determine the current position on a virtual plane of the camera field of view. This will be explained later.

Figure 3A:
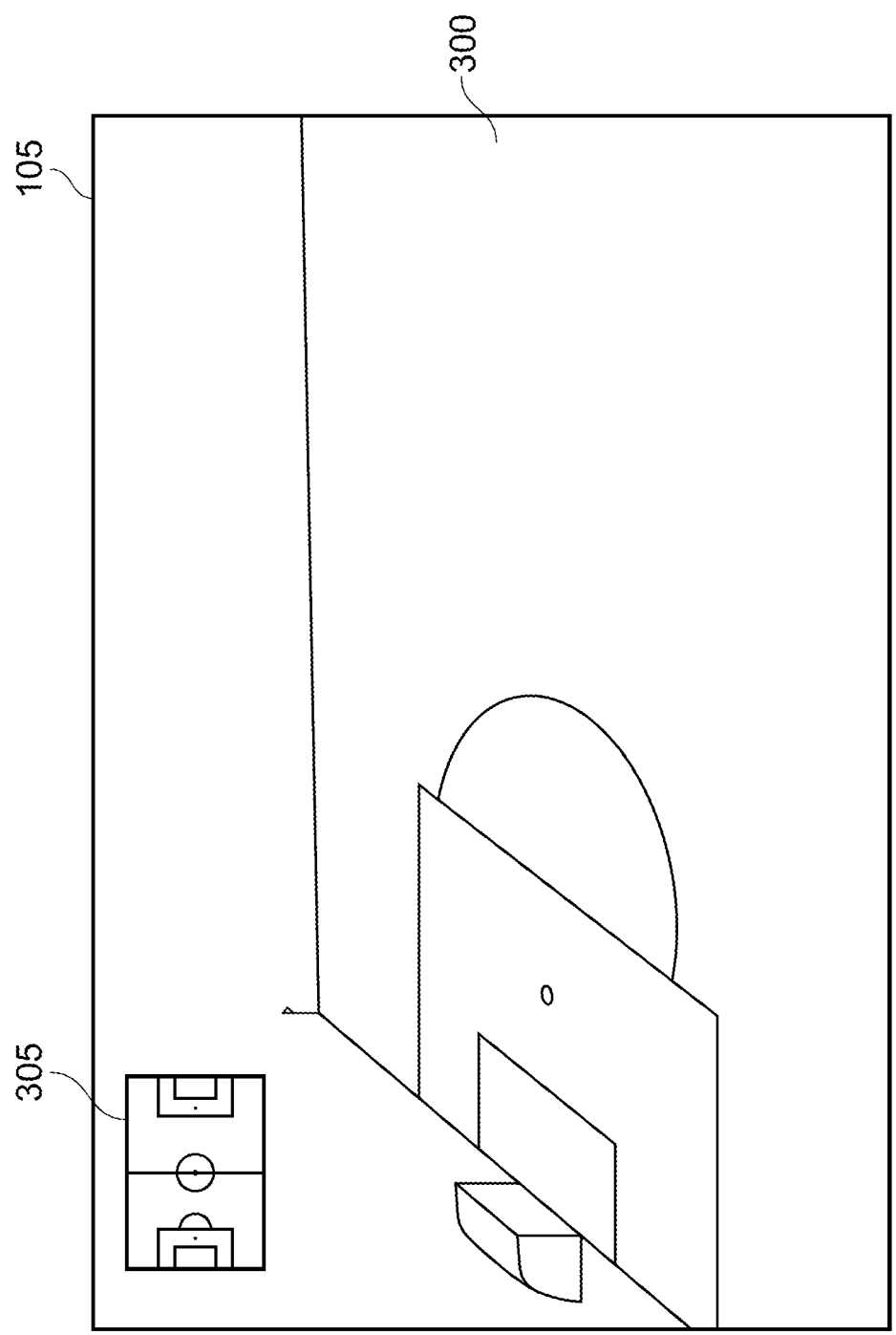
FIGS. 3A and 3B show a screen display explaining a calibration process.

FIG. 3A shows a screen shot from the terminal 105 during a calibration stage. In the following, the terminal 105 is a tablet computer such as a Sony® Xperia® Tablet. However, any tablet is envisaged. Additionally, the terminal 105 may be a personal computer with a display. The display may be a touch screen display or any kind of other display.

It should be noted that the calibration stage is known and is explained in, for example, GB2473059A.

On the display of the terminal 105 there is an image of a part of a soccer pitch 300. Although only a part of the soccer pitch is shown, in reality the entire soccer pitch may be shown. The pan, tilt and zoom of the camera in the camera arrangement 110 for this field of view is sent to the processor 201.

Figure 3B:
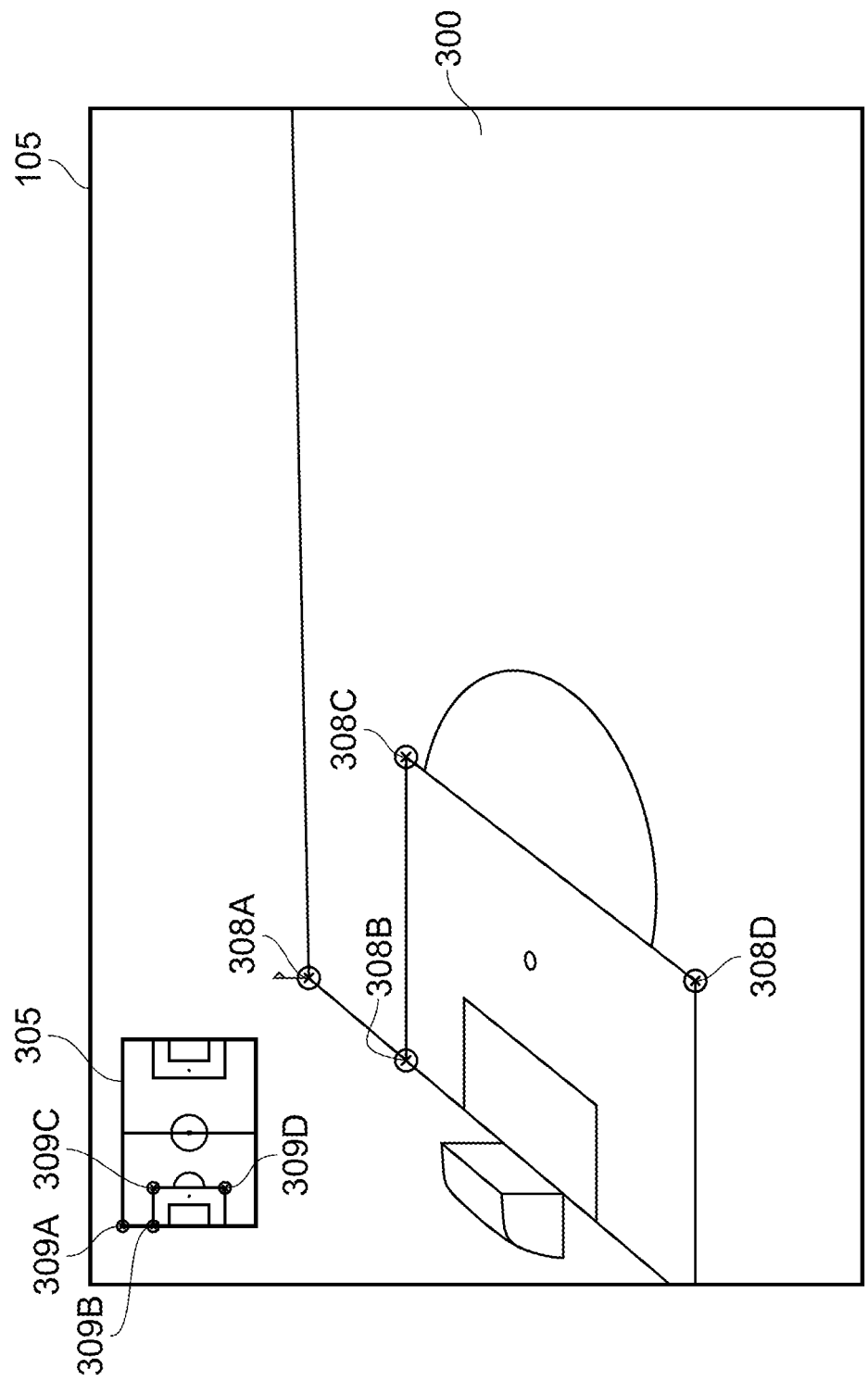

Additionally located on the display of the terminal 105 is an overhead map 305 of the entire pitch. As known to the skilled person, the user of the terminal 105 selects one point on the overhead map 305 and selects a corresponding point in the image of the part of the soccer pitch 300. In the example of FIG. 3B this is shown. Firstly, the user selects point 309A on the overhead map 305 where the corner flag is located. The user then selects point 308A on the image 300. Secondly, the user selects point 309B on the overhead map 305 and then selects point 308B on the image 300. The user continues to select points of intersections on the overhead map and the corresponding points on the image 300. In the example of FIG. 3B, the user of the terminal 105 selects points 309C and 309D on the overhead map 305 and the corresponding points 308C and 308D on the image 300 respectively. As explained in GB2473059A and known to the skilled person, this provides a mapping between the pixel position on the image 300 and a particular point on the virtual plane shown as the overhead map 305. Moreover, as the real-life distance between the different points on the image 300 is known, it is possible to map the particular points to specific points on the soccer pitch. In other words, as the distance between the intersections 308A and 308B. 308B and 308C and 308C and 308D on the real life soccer pitch is known, it is possible to map the position of an object in the image to both the real life soccer pitch and to the virtual plane for a given amount of yaw, pitch and zoom.

Figure 4A:
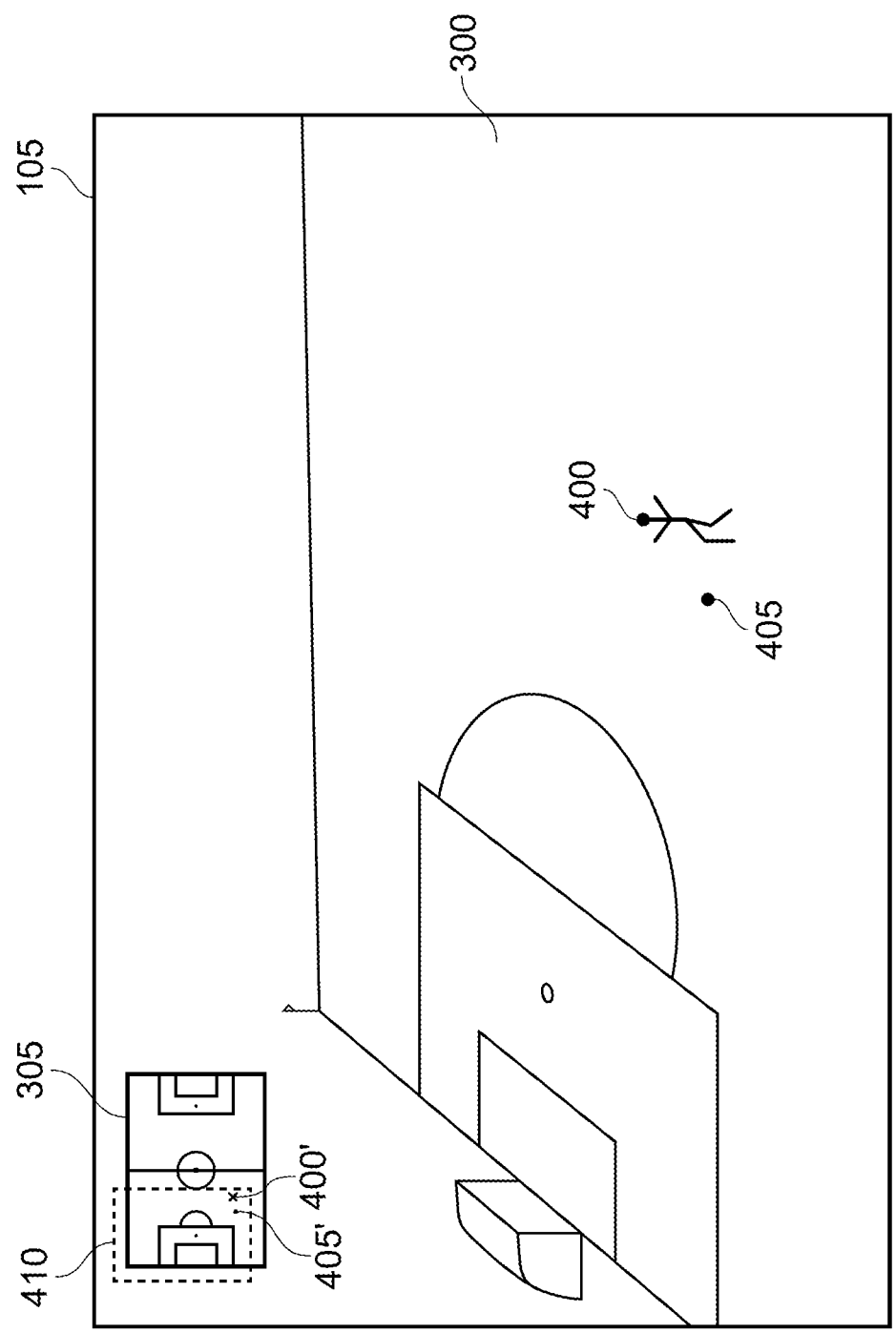

FIG. 4A shows an image of the soccer pitch in operation; or in other words, after calibration of the system described in FIGS. 3A and 3B.

A player 400 is seen running on the pitch. The player 400 is chasing ball 405. The location of the player in the image 305 is identified using, in this example, a known object recognition technique. In other words, for each image 300 captured by the camera in the camera arrangement 110, an object detection algorithm is performed. This identifies the presence and location within the image 300 of the object. In this case, the object recognition system identifies the presence and location of the player 400. However, the object recognition system may be configured to detect the presence and location of the ball 405 or any other object. Of course, the position of the player, or any object in the image can be determined by any suitable means such as manually or the like.

Further, it is envisaged that not only will a certain object be detected and tracked between consecutive images, but the system will also identify a specific individual player from the image. This may be achieved by tracking facial features or a number on the shirt or shorts of the player. The location of the player within the image 300 is stored within the storage unit 205. Additionally stored within the storage unit 205 are the frame of video and the camera parameters of the or each camera in the camera arrangement 110.

As the user performed the calibration process as explained in FIGS. 3A to 3C, the processor 201 converts the detected position of object 400 in the image 300 into a corresponding position on the virtual plane shown in the overhead map 305. This enables the position of the player 400' to be marked on the overhead map 305. Moreover, the position of the ball 405' is also marked on the overhead map 305.

Additionally shown on the overhead map 305 is a camera field of view marking 410. The field of view marking 410 shows on the overhead map 305 the field of view of the camera in the camera arrangement 110. This is calculated by the processor 201. The field of view marking 410 is derived from the pixel positions of the image 300 for a given value of zoom, yaw and pitch calculated during the calibration step.

It is useful to provide the field of view marking 410 as the user of the terminal 105 can see the area of pitch in view.

Figure 4B:
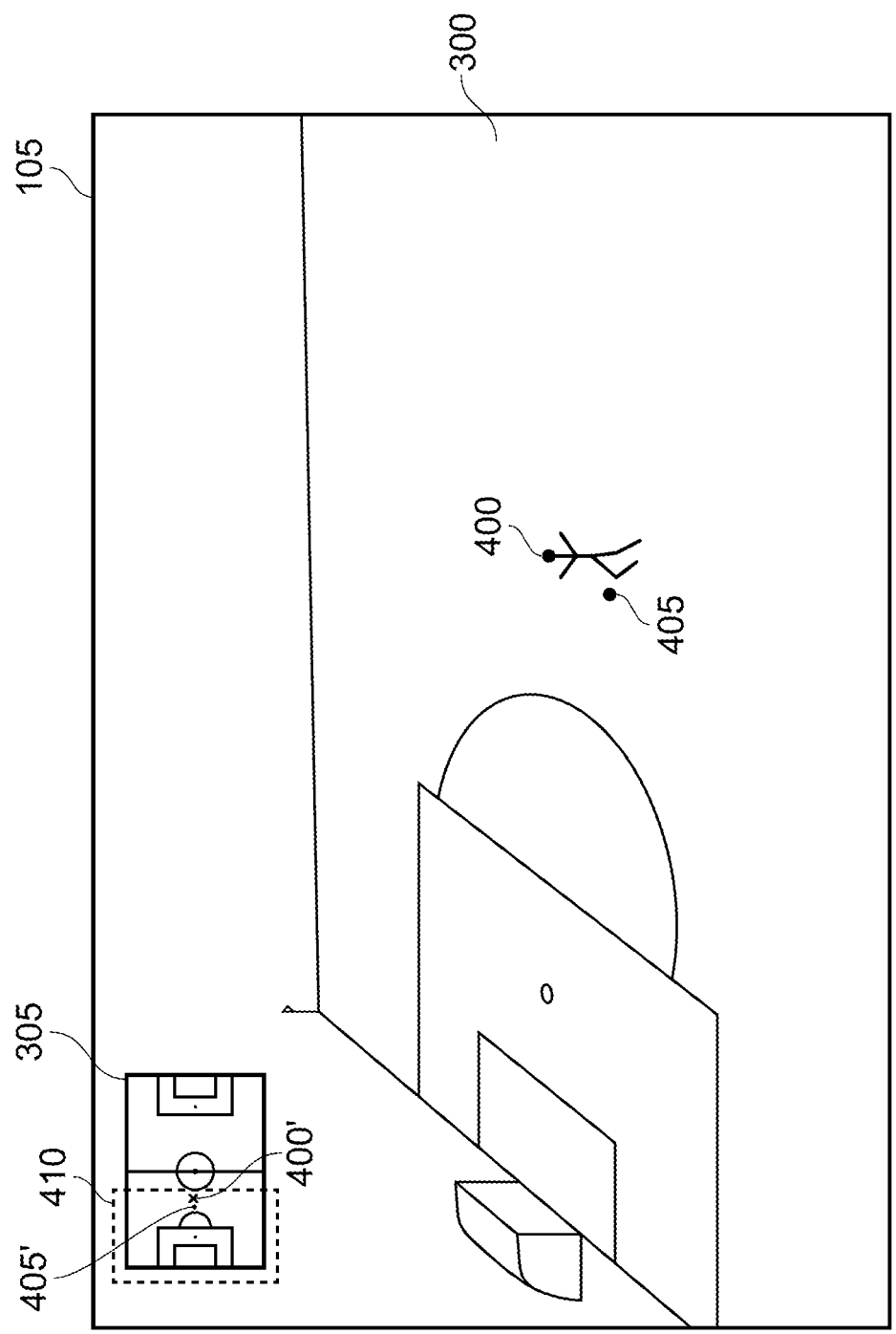

In FIG. 4B a second successive frame from the camera is shown. In this, the player 400 and the ball 405 have moved to a second position within the image 300. Again, the position of the player 400 and the ball 405 is identified in the image 300 using object detection and recognition. The position of the player 400 and the ball 405 is marked on the overhead map 305 as position 400' and 405' respectively. Again the field of view marking 410 is shown on the overhead map 305. Of course, it is envisaged that any metadata could be used that identifies the position of the object on the pitch. In this case, this may be provided externally to the disclosed system. For example, the image could be analysed in a specific object detection and tracking system and the metadata sent to the apparatus. Alternatively, a user could identify the position of the object manually and provide this to the apparatus.

It is noted here that the pan, tilt and zoom parameters of the camera in the camera arrangement 110 is the same in both FIGS. 4A and 4B.

It is possible for the camera in the camera arrangement 110 to zoom in onto the position of the player 400. The effect of this is shown in FIG. 4C. It should be noted here that the zoom using a remote controlled camera as provided in the camera arrangement 110 provides a zoomed image with improved clarity compared with the virtual camera of GB2473059A. This is because the zoomed image in GB2473059A is a digitally zoomed image. However, in embodiments, where the pan, tilt and zoom of a real camera is controlled, the zoom is provided by a lens arrangement and so provides an improved clarity compared with the virtual camera of the prior art.

In order to control the zoom, the position of the player 400 on the virtual plane is determined. This was explained previously. The camera field of view is then determined based on the position of the player 400 on the virtual plane. In other words, the field of view of the camera in the camera arrangement 110 may be determined as being a predetermined shape and size centred on the position of the player 400' on the virtual plane (i.e. the overhead map 305). In one example, the field of view of the camera is a square shape of 50 pixels centred on the position of the player 400'. This is shown as field of view 410' in FIG. 4C. Of course, this example is arbitrary and any size or shape of field of view may be provided. Specifically, the shape of the field of view may be similar to the virtual cut out in GB2473059A. In other words, the shape of the field of view may replicate the field of view that would otherwise be provided by a traditional broadcast camera capturing the action.

After the size and shape of the field of view on the virtual plane has been decided by the processor 201, the processor 201 instructs the camera output unit 220 to send modified pan, tilt and zoom instructions to the camera in the camera arrangement 110. Specifically, the processor 201 sends an instruction to the camera in the camera arrangement 110 to adjust the pan, tilt and zoom parameters to capture the field of view defined on the virtual plane by the field of view 410'.

The camera adjusts the pitch, zoom and yaw as instructed and the output of the camera is shown on the display 105. As can be seen, this shows a close-up of the player 400 and the ball 405. As can be seen in FIG. 4C, the overhead map of the entire real-life scene is shown with the boundary line 410' of the field of view of the camera capturing the player 400 shown. This is overlaid on the image and provides the user of the system with a very quick view of the position of the real-life camera. This is useful as an interface for the user as this assists in determining the field of view of the camera relative to the scene.

Figure 5A:
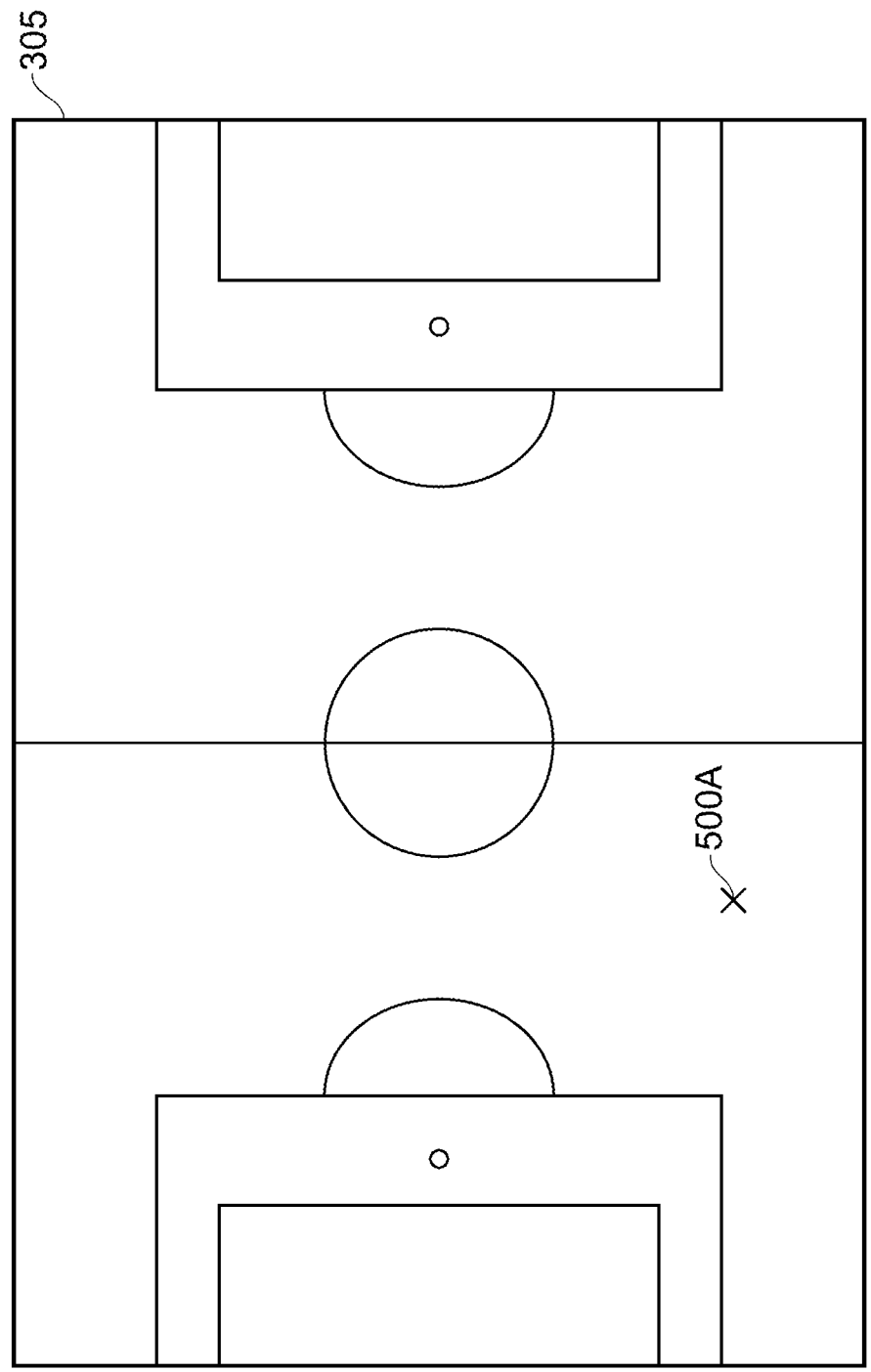
FIGS. 5A to 5D show a position prediction technique according to embodiments of the disclosure.

Although FIG. 4C shows a mechanism by which the camera in the camera arrangement 110 can zoom in on a player using a real camera, in reality, there is a slight time delay in issuing the instruction for the camera in the camera arrangement 110 to change its pan, tilt and zoom and the camera actually performing this change. In a fast moving event like soccer, where the position of the player or ball or object of interest changes rapidly, the delay may result in the output from the camera missing some action. In embodiments, therefore, this problem is addressed. The solution to this is explained with reference to FIG. 5A to FIG. 5D In FIG. 5A, the overhead map 305 is shown. For ease of understanding, the overhead map 305 shows a virtual plane of the soccer pitch captured by the camera in the camera arrangement 110.

Figure 5B:
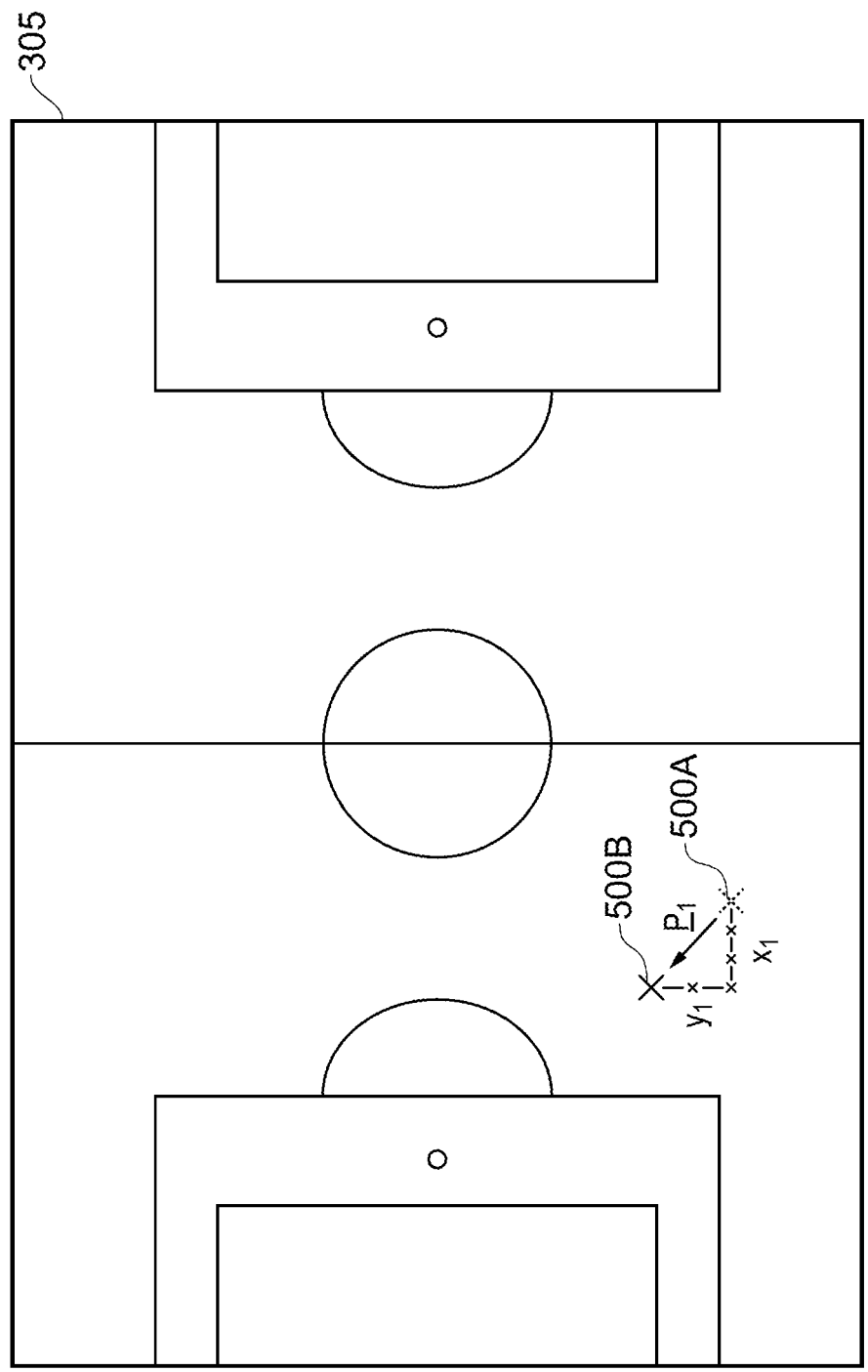
Figure 5C:
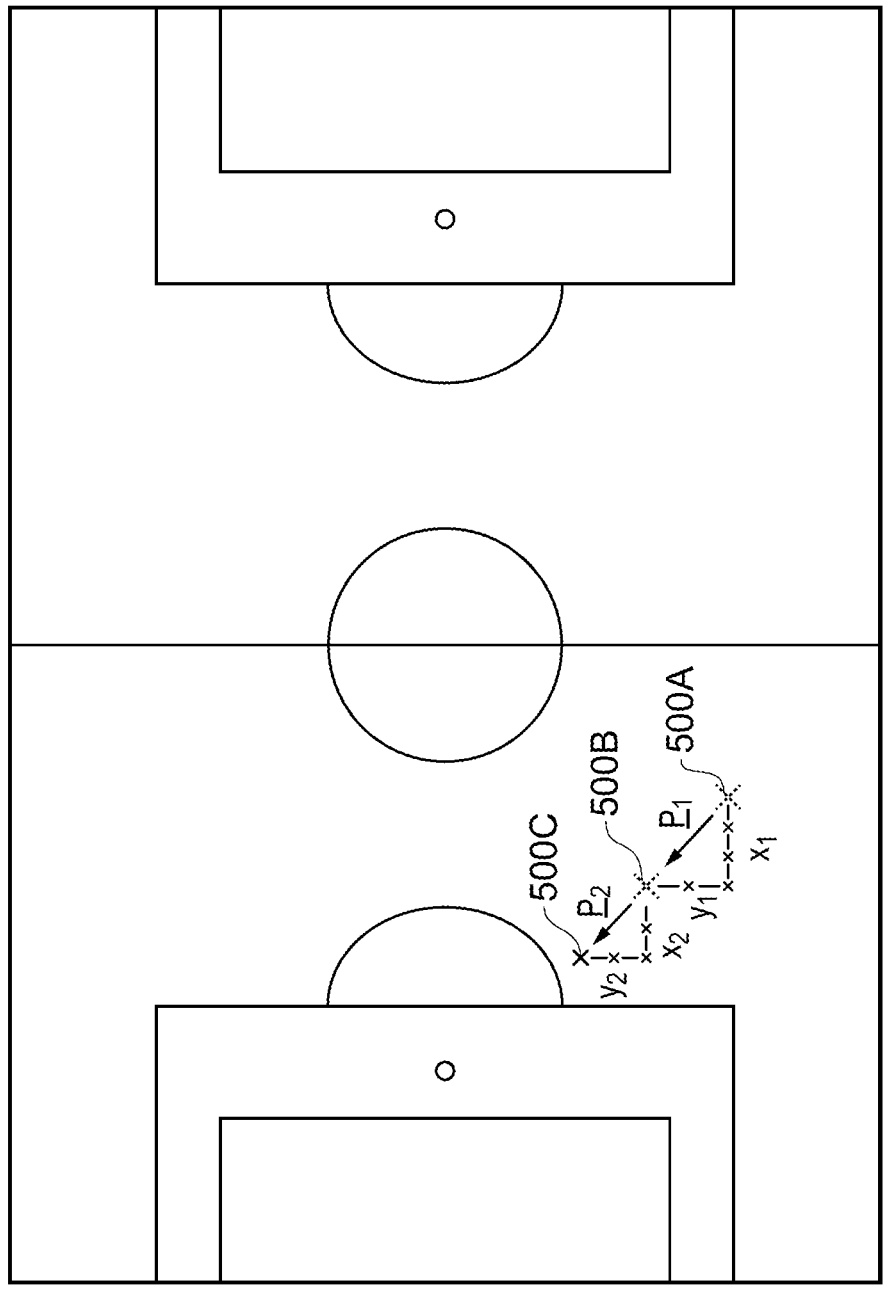

Located on the overhead map 305 is a player located at position 500A. The position 500A of the player is determined from the captured image and transformed to the virtual plane as explained above. FIG. 5B shows the overhead map identifying the new position of the player a predetermined period of time after the overhead map of FIG. 5A was determined. As is seen in FIG. 5B, the player has moved by a vector P1 to position 500B. FIG. 5C shows a new position of the player a predetermined period of time after the overhead map of FIG. 5B was determined. The player, in FIG. 5C has moved by a vector P2 from position 500B to position 500C.

As the player has travelled consistently in a certain direction over a predetermined period of time, it is possible to predict the position of the player a predetermined period of time later. In other words, the average change of position of the player is shown in equation 1.

$$P_{av} = \frac{[P2] - [P1]}{nX \text{ time}} \qquad \text{Equation (1)}$$

Where $P_{av}$ is the average vector change of the position of the player; P2 is the vector position of the player at position 500C; P1 is the vector position of the player at position 500B; n is the number of predetermined periods, which in this case is 2; and time is the period of time of the predetermined period.

The value of $P_{av}$ is used to determine a predicted position a further predetermined period of time later. Specifically, referring to FIG. 5D, the predicted position of the player is position 500D. Position 500D is located a vector $P_{av}$ away from position 500C.

Figure 5D:
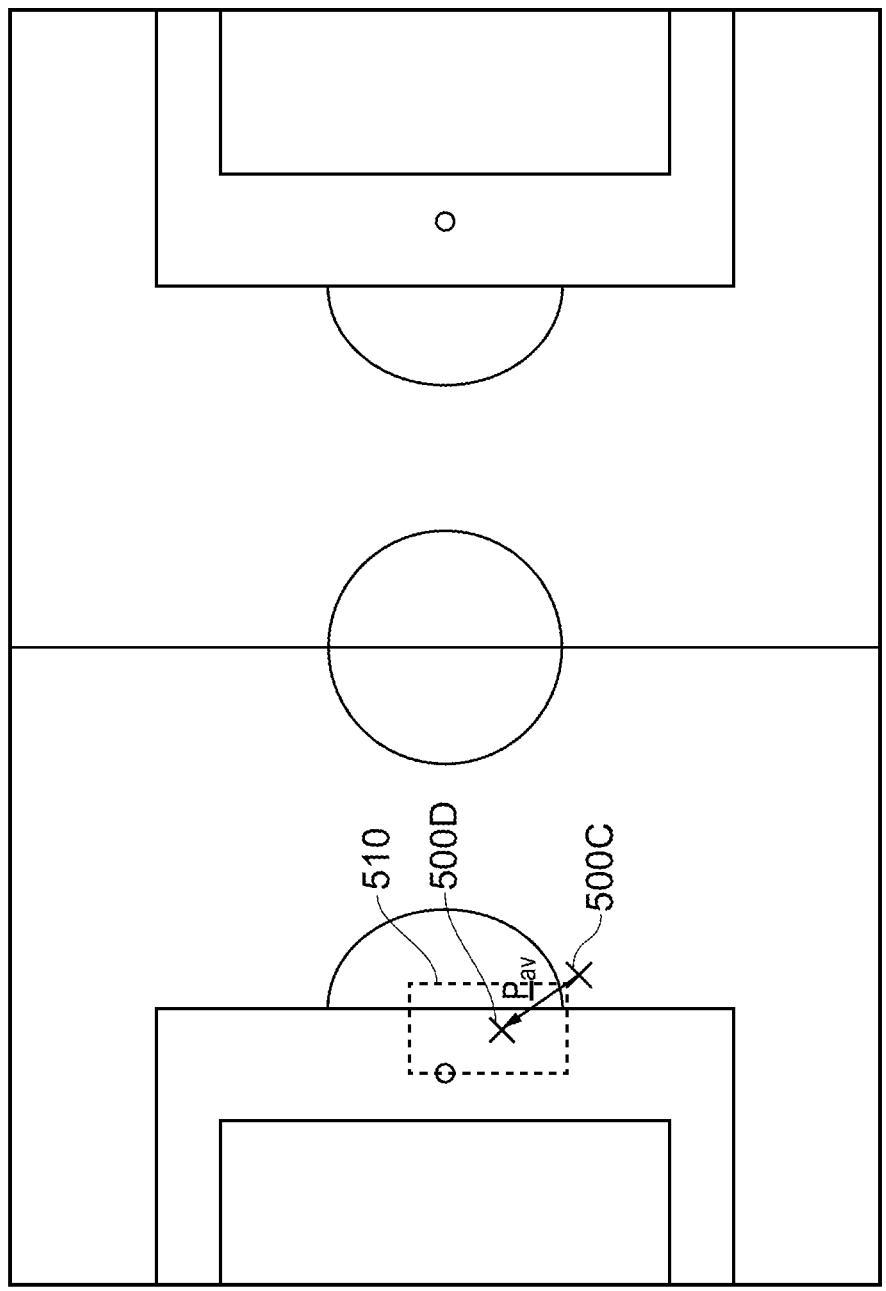

As is seen from FIG. 5D, the camera field of view 510 is centred on position 500D. In other words, the camera field of view 510 is centred on the predicted position of the player rather than the current position of the player.

Of course, the camera field of view 510 is centred on the predicted position of the player on the virtual plane. Using the transformation derived at the calibration step, it is possible to identify the pan, tilt and zoom parameters of the camera in the camera arrangement 110 required to achieve this desired camera field of view 510. These parameters are determined by the processor 201 and sent to the camera output unit 220. The camera output unit 220 sends the parameters to the camera in the camera arrangement 110. The camera uses these parameters to output the appropriate image of the soccer pitch.

By predicting the field of view of the camera, it is possible to compensate for the time taken to correctly position the camera in the camera arrangement 110. In other words, in embodiments, automatic object tracking may be realised using real cameras rather than virtual cameras. This allows for the clarity of the field of view to be improved.

Although the above describes a prediction technique, it is envisaged that the position of the camera will be predicted every frame. This is because it is possible that in an automated system, if the position of the camera was predicted every frame, the camera in the camera arrangement 110 will move too often. This may lead to an uncomfortable viewing experience for the viewer. Therefore, in order to avoid this situation, it is envisaged that the camera will be moved to the predicted position if the predicted position is a predetermined threshold distance from the current position.

Although the above has describes the predicted position being based on an average movement of a detected object (in this embodiment a player), the disclosure is not limited to this. For example, the prediction could be based on the change in position between any two consecutive frames in sequence of frames. As an example, the difference in position between consecutive frames in the last 20 frames could be determined and a median value of the position differences selected. This could be used to calculate the predicted position. Additionally, in the context of sports where bursts of speed are common, the predicted position may be determined by analysing the acceleration of the detected object over a predetermined number of preceding frames. The predicted position may then be determined in accordance with this acceleration. In other words, the predicted position is based on a constant rate of acceleration of the object.

Moreover, it is envisaged that the field of view of the camera capturing the detected object may be wider when moving to a predicted position. This ensures that any error in the predicted position does not inhibit the viewer from seeing the detected object. This is particularly useful when detecting a fast moving object.

Although the foregoing describes the detected object being either a player or a ball, the disclosure is not so limited. For example, the detected object may include several different objects such as a particular group of players, or the combination of a player (or group of players) and the ball. In this case, the position and the predicted position may be the centre of the group rather than the specific location of the player. Moreover, in this case, the position marked on the overhead map may be different to the predicted position of the camera field of view. Further, the field of view of the camera may be chosen to include each member of the group. Sometimes each different object may be referred to as constituent parts of the overall object; the object being, in this case, the group.

Figure 6:
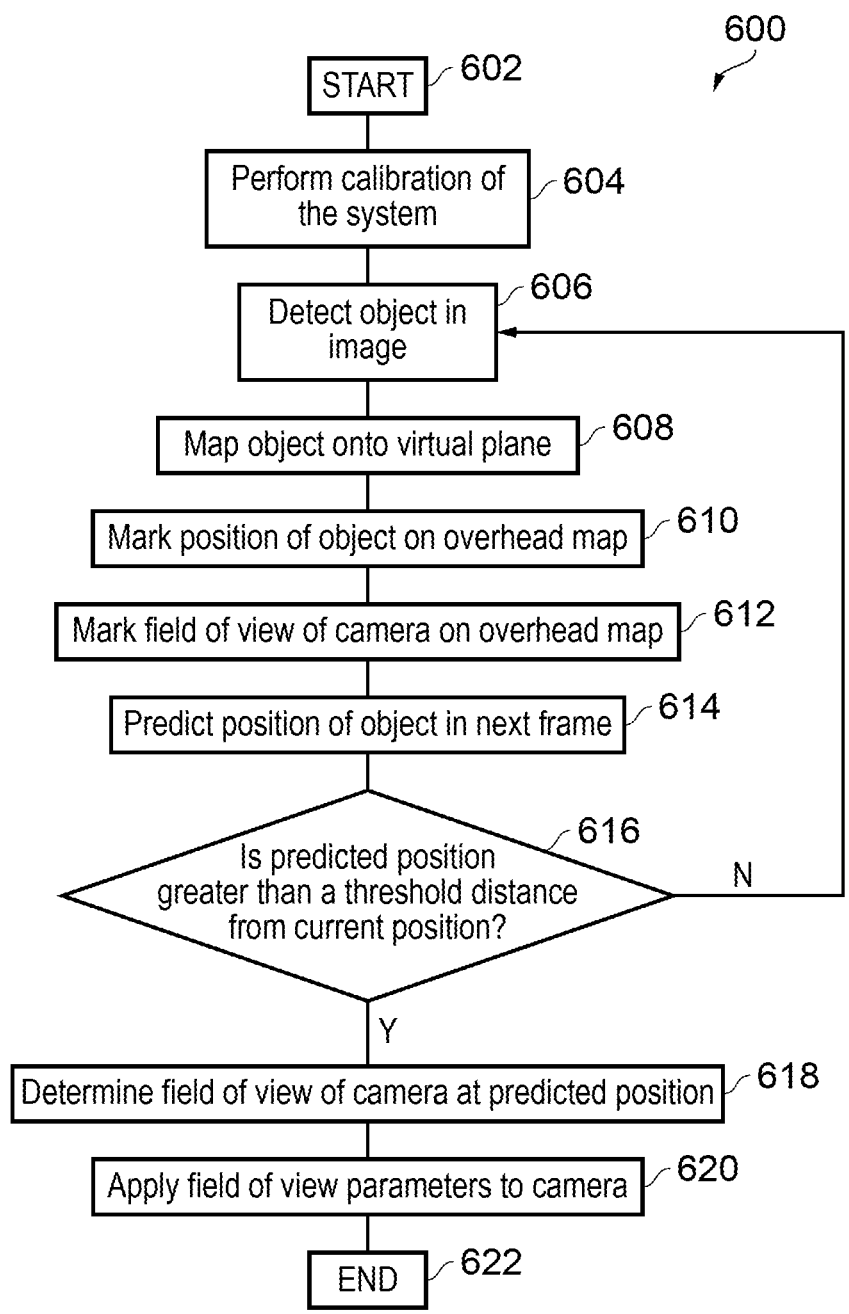
FIG. 6 shows a calibration flowchart according to embodiments of the disclosure.

A flow chart 600 is shown in FIG. 6 explaining the operation of the image processing apparatus of FIG. 2. Typically, it is envisaged that the flow chart will be embodied as computer software. The flow chart starts at step 602. The known calibration process is then carried out at step 604. The position of the desired object (or group of objects) is detected in the image at step 606. The position of the desired object is mapped from the image to the virtual plane in a known manner is step 608. The position of the desired object is marked on the overhead map in step 610. The field of view of the camera in the arrangement is marked on the overhead map in step 612. This can be achieved because the pixel position of the image captured by the camera is known and these pixel positions are translated onto the overhead map.

The predicted position of the object is determined in step 614 according to embodiments of the present disclosure. At point 616, it is determined whether the predicted position is greater than a threshold distance from the current position. If the predicted position is not greater than a threshold, then the "no" path is followed and the process moves to the next frame of video and then starts from step 606. However, if the predicted position is greater than a threshold, the "yes" path is followed and the field of view of the camera is determined at the predicted position. This is step 618. The field of view parameters are then applied to the camera or cameras in the arrangement in step 620. The process then ends at step 622.

Timeline and Presentation Generation

As well as the use of one or more movable cameras for capturing video images of a sporting event (as described above), it is also known from, for example, the system disclosed in patent application GB2473059 (derived from UK patent application GB0915114.3) filed by Sony Corporation, that a non-moving camera (or cameras) may be used to capture a video recording of a sporting event. Such a camera (or cameras) will have a field of view of the scene of the sporting event such that the area of the scene in which the sporting event takes place (for example, a soccer pitch) and all participants of the sporting event (for example, all soccer players) are within the field of view. A problem with such an arrangement, however, is that it can be difficult to analyse specific details of the sporting event. The present disclosure therefore aims to alleviate this problem.

Figure 7:
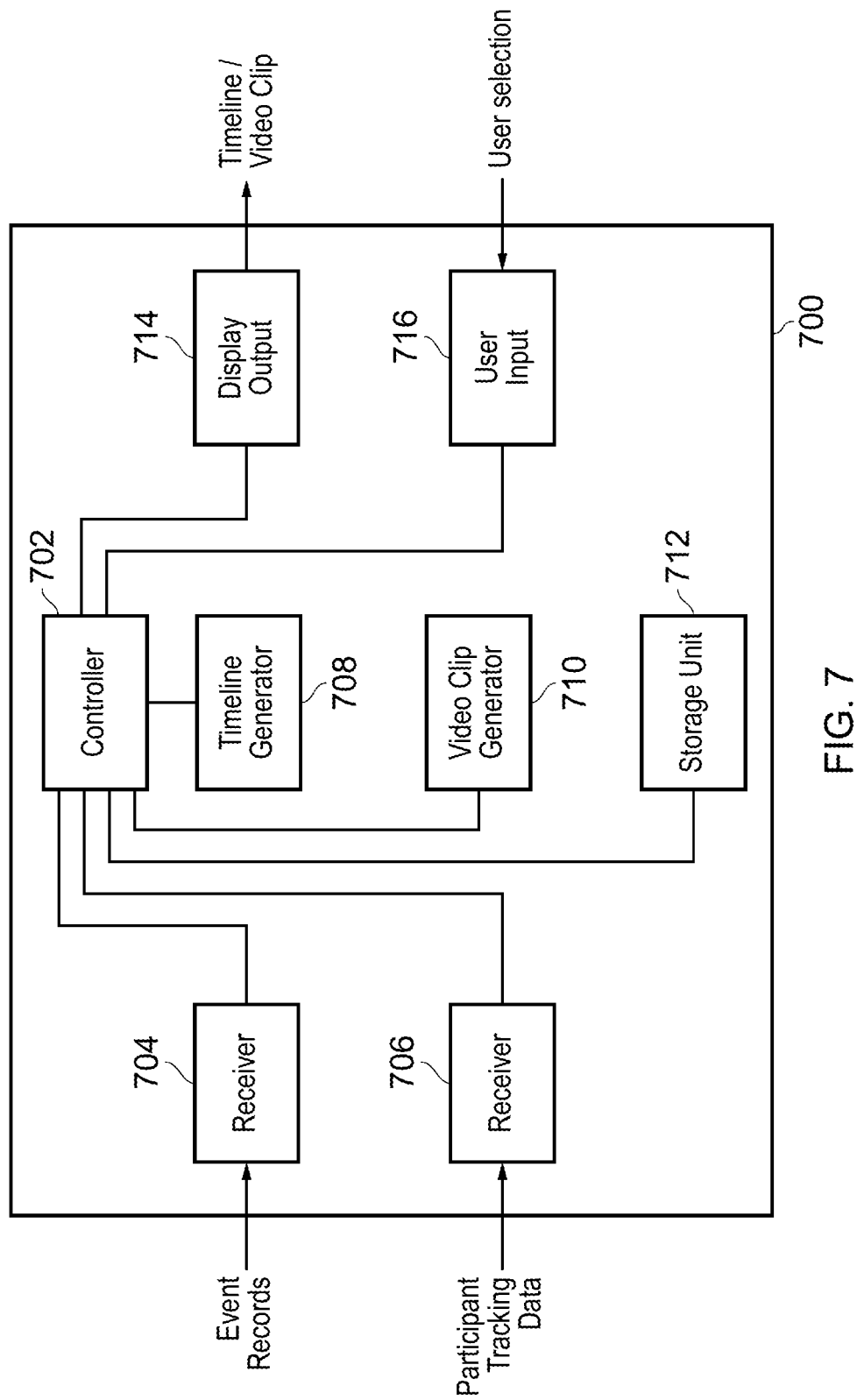
FIG. 7 schematically illustrates an apparatus according to an embodiment of the present disclosure.

FIG. 7 schematically illustrates an apparatus 700 according to an embodiment of the present disclosure. The apparatus 700 comprises a first receiver 704 for receiving event records, a second receiver 706 for receiving participant tracking data, a timeline generator 708, a video clip generator 710, a storage unit 712, a display output element 714 and a user input element 716. Each of these elements is controlled by a controller 702 of the apparatus 700.

The storage unit 712 comprises a video recording of a sporting event such as a soccer match or the like. The video recording is captured with a camera with a field of view of the scene of the sporting event such that the area of the scene in which the sporting event takes place (for example, a soccer pitch) and all participants of the sporting event (for example, all soccer players) are within the field of view. Furthermore, the video recording is continually captured whilst the sporting event is in progress. Thus, the sporting event in its entirety is captured as part of the video recording.

As mentioned above, however, such a view of the sporting event in its entirety can make it difficult to analyse more specific details of the sporting event. The present disclosure therefore aims to alleviate this problem.

In order to help analyse details of the sporting event in the video recording, data is collecting during the sporting event regarding particular events which occur during the sporting event. An example of such data is provided in FIG. 8, which shows data collected at a soccer match.

Each event in FIG. 8 comprises a start time, an end time and an identifier for identifying the event. The combination of the start time, end time and identifier of an event is referred to as an event record. Six event records are shown in FIG. 8. However, this is merely for ease of explanation, and in reality, a soccer match is likely to include many more event records than six.

The first event record 800 has a start time of 00:05:36 (that is, 0 hours, 5 minutes and 36 seconds), an end time of 00:06:14 and an identifier of "Player 1". This indicates that an event involving soccer player "Player 1" occurred between the times 00:05:36 and 00:06:14 of the sporting event (and of the video recording of the sporting event). Note that a clock used to record the start and end time of each event during the sporting event is synchronised with a clock used for recording the elapsed time of the video recording of the sporting event. Thus, an event which is recorded with a start time of 00:05:36 and an end time of 00:06:14 during the sporting event (as is the case with first event record 800) will be replayed in the video recording of the sporting event when the video recording is replayed between times 00:05:36 and 00:06:14.

The second event record 802 has a start time of 00:08:13, an end time of 00:08:43 and an identifier of "Player 2". This indicates that an event involving soccer player "Player 2" occurred between the times 00:08:13 and 00:08:43 of the sporting event (and of the video recording of the sporting event). Similarly, the third event record 804 has a start time of 00:08:20, an end time of 00:08:49 and an identifier of "Player 3". This indicates that an event involving soccer player "Player 3" occurred between the times 00:08:20 and 00:08:49 of the sporting event (and of the video recording of the sporting event).

The fourth event record 806 has a start time of 00:08:10, an end time of 00:08:52 and an identifier of "Free Kick". This indicates that a free kick was awarded to one of the soccer teams between the times 00:08:10 and 00:08:52 of the sporting event (and of the video recording of the sporting event).

The fifth event record 808 has a start time of 00:11:12, an end time of 00:11:13 and an identifier of "Player 2". This indicates that a further event involving soccer player "Player 2" occurred between the times 00:11:12 and 00:11:13 of the sporting event (and of the video recording of the sporting event). This is in addition to the event involving "Player 2" which was recorded as event record 802.

The sixth event record 810 has a start time of 00:10:58, an end time of 00:11:41 and an identifier of "Yellow Card". This indicates that a player of one of the soccer teams was penalised with a yellow card between the times 00:08:10 and 00:08:52 of the sporting event (and of the video recording of the sporting event).

It is noted that each of the events for which there is an event record may have occurred over the same or over an overlapping time period. For example, event records 802, 804 and 806 all occur over respective time periods which overlap. This may occur when the events associate with event records 802, 804 and 806 are linked. For example, there may have been an incident involving "Player 2" and Player 3" which led to a free kick being awarded. Similarly, event records 808 and 810 each occur over respective time periods which overlap, perhaps indicating that "Player 2" was penalized with a yellow card. As will be explained, an advantage of the present disclosure is that it is easier for a user to navigate through the events recorded for a video recording of a sporting event and to see which events may be linked.

In embodiments, each event record may be recorded live during the sporting event or during an initial playback of the video recording of the sporting event. Furthermore, the event records for each identifier may be recorded by a dedicated observer who focuses solely on a particular participant (soccer player, in this example) or event. For example, a first observer may continually observe "Player 1" and create an event record with the identifier "Player 1" each time there is an event involving "Player 1". A second observer may continually observe the soccer match and create an event record with identifier "Free Kick" whenever a free kick is awarded. Thus, either during the sporting event, or afterwards on the basis of the video recording of the sporting event, a collection of event records is produced.

The event records in the format as shown in FIG. 8 are, however, not very intuitive for analysis by a user. That is, given the list of event records shown in FIG. 8, it is not very easy for a user to navigate through these records in conjunction with the video recording of the sporting event (this may be referred to simply as the video recording) so as to obtain meaningful information about the sporting event. Embodiments of the present disclosure aim to alleviate this problem.

In order to do this, the complete collection of event records associated with the soccer match is received by the first receiver 704 of the apparatus 700. The controller 702 then controls the timeline generator 708 to convert the collection of event records into a timeline and to output the timeline for display on a display device (not shown in FIG. 7) via display output element 714. The timeline is shown in FIG. 9.

Figure 9:
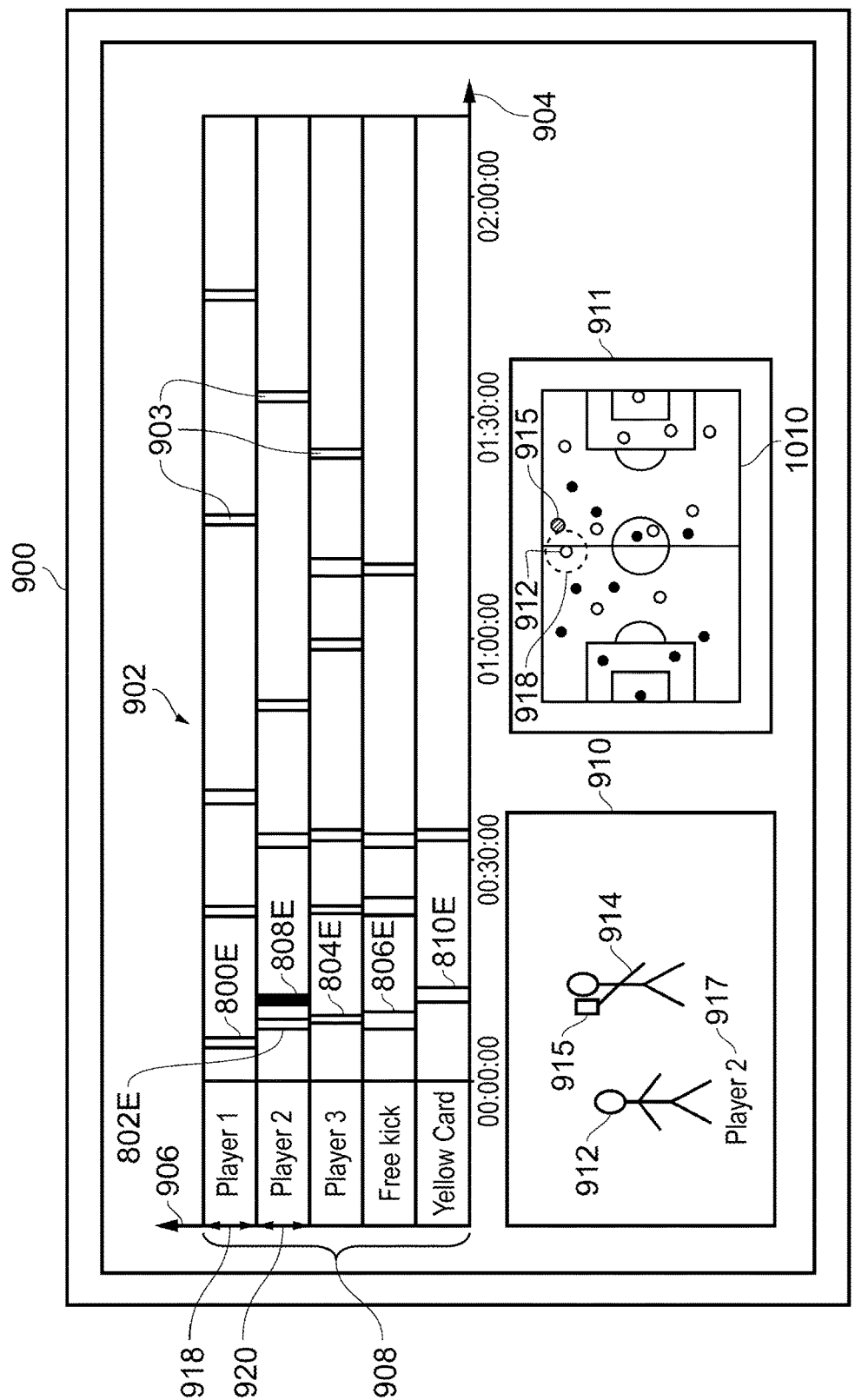
FIG. 9 shows a display device displaying a timeline according to an embodiment of the present disclosure.

FIG. 9 shows a display device 900 (which may be any suitable device for displaying an electronic image, such as a tablet computer, smartphone, laptop or television, for example). The display device 900 displays the timeline 902 generated by the timeline generator 708 and output by the display output element 714.

The timeline 902 comprises a first axis 904 along which the elapsed time of the video recording is indicated and a second axis 906 along which the identifiers 908 of the event records are indicated. The timeline 902 also comprises a plurality of timeline elements 903, each of which corresponds to a respective one of the event records. For example, timeline element 800E corresponds to event record 800 shown in FIG. 8. Similarly, timeline elements 802E. 804E, 806E, 808E and 810E correspond, respectively, to event records 802, 804, 806, 808 and 810 shown in FIG. 8.

Each timeline element extends along a portion of the first axis 904 defined between the start time and end time of its corresponding event record. Thus, for example, timeline element 800E extends along the first axis 904 between the start time 00:05:37 and end time 00:06:14 of corresponding event record 800, timeline element 802E extends along the first axis 904 between the start time 00:08:13 and end time 00:08:43 of corresponding event record 802, etc.

Also, each timeline element extends along a portion of the second axis 906 associated with the identifier of its corresponding event record. Thus, for example, timeline element 800E extends along the second axis 906 along a portion 918 of the second axis 906 associated with identifier "Player 1" of corresponding event record 800, time elements 802E and 808E extent along the second axis 906 along a portion 920 of the second axis 906 associated with the identifier "Player 2" of corresponding event records 802 and 808, etc.

Thus, as shown in FIG. 9, the timeline 902 comprising timeline elements 903 allows the start time, end time and identifier of each event record to be seen in an intuitive manner. In particular, with the timeline 902, event records which may be related can be easily identified, since the timeline elements associated with those event records will appear on the timeline over the same or over an overlapping time period. For example, it can be seen that the timeline elements 802E, 804E and 806E (relating to event records 802, 804 and 806, respectively) all line up on the timeline over an overlapping time period, perhaps indicating that there was an incident involving "Player 2" and "Player 3" which resulted in a free kick being awarded during the soccer game. Similarly, it can be seen that timeline elements 808E and 810E (relating to event records 808 and 810, respectively) each line up on the timeline over an overlapping time period, perhaps indicating that "Player 1" was penalised with a yellow card. The timeline 902 therefore makes it easy and intuitive for a user to identify event records that are potentially linked.

It will be appreciated, however, that even though potential links between event records can be easily established on the basis of the timeline 902, these links cannot be confirmed without reviewing the video recording of the sporting event at the times indicated by the event records of interest. Embodiments of the present disclosure allow the video recording to be reviewed in this regard via an arrangement which is intuitive and convenient for the user.

In order to explain this, it is noted that the video recording is stored as an electronic video file in the storage unit 712. The storage unit 712 may be any suitable storage unit such as semi-conductor storage, magnetic storage or optical storage. The video recording comprises a plurality of electronic images (or frames) which are successively displayed at a predetermined frame rate during playback of the video recording, as is well known in the art. Each of the frames may be captured from a single camera (such as a high definition or 4K camera) or may be formed from stitching together two or more high definition or 4K images. An example of an image stitching system is found in patent application GB2473059 (derived from UK patent application GB0915114.3) filed by Sony Corporation. As already mentioned, each frame of the video recording has a field of view of the scene of the sporting event such that the area of the scene in which the sporting event takes place (for example, a soccer pitch) and all participants of the sporting event (for example, all soccer players) are within the field of view. The video recording may therefore be referred to as a full view video recording.

A cut-out (or virtual camera view) of the video frames can be created which mimics the output of a broadcast video camera capturing the image in real-time. That is, a cut-out, which is a zoomed-in and perspective-corrected portion of each video frame, is created, and the portion of each video frame which is defined by the cut-out is fed at the predetermined frame rate to a device such as a smartphone, tablet or television for viewing by the user. The image viewed on this device mimics that which would have been captured by a real camera with a yaw, pitch and zoom adjusted so as to capture a portion of the scene of the sporting event which has been captured in full in the video recording. An example of this type of system is found in patent application GB2512621A (derived from UK patent application GB1306050.4) filed by Sony Corporation. In an alternative embodiment, however, the cut-out may be a zoomed-in portion of each video frame without perspective correction.

The video clip generator 710 is configured to generate a cut-out of the video recording and to output this cut-out for display via the display output element 714. The cut-out is generated on the basis of participant tracking data received by the second receiver 706 and a selection of one or more timeline elements 903 by a user of the apparatus 700, as described below.

The participant tracking data indicates a position of each participant of the sporting event for which there is at least one corresponding event record at a plurality of times during the elapsed time of the video recording of the sporting event. Each position of each participant is recorded in a way such that it can be mapped to a particular yaw, pitch and zoom of the virtual camera used by the video clip generator 710 to generate the cut-out so that the output cut-out image at that yaw, pitch and zoom includes the relevant participant. An example of participant tracking data for "Player 1" is shown in FIG. 10.

Figure 10:
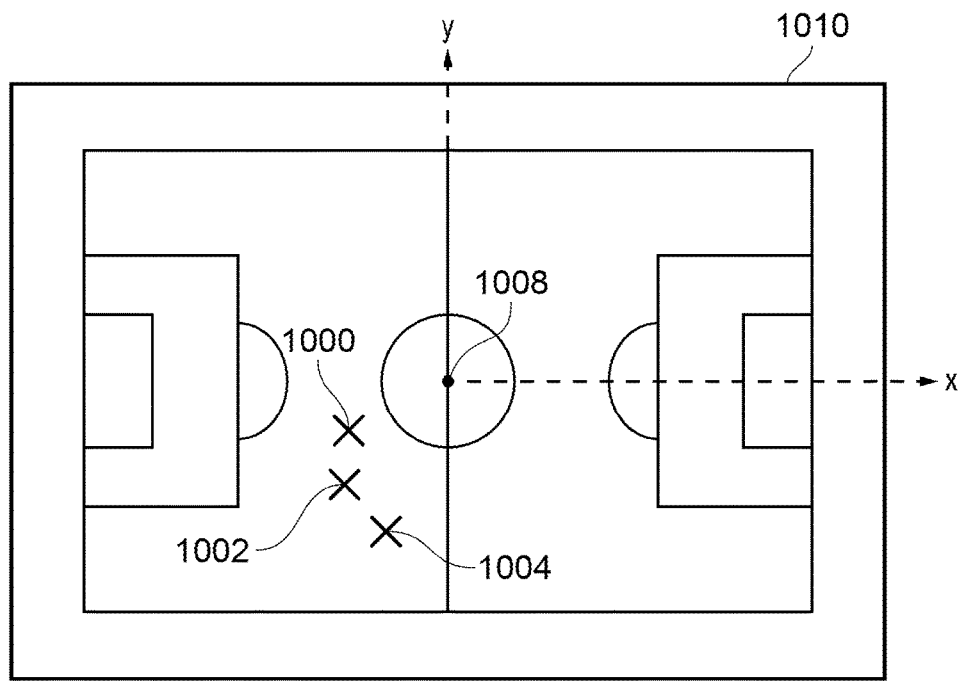
FIG. 10 shows an example of participant tracking data according to an embodiment of the present disclosure.

It can be seen in FIG. 10 that the participant tracking data for "Player 1" includes a horizontal ("x") position of the player along a first dimension of the soccer pitch and a vertical ("y") position of the player along a second dimension of the soccer pitch at each of a number of times. The "x" and "y" positions therefore form a two dimensional coordinate system relative to the soccer pitch, which is an example of a surface on which a sporting event is carried out.

In this example, for simplicity of explanation, the (x, y) position of "Player 1" is recorded once every second during the video recording. Thus, at time 00:00:01. "Player 1" position 1000 is recorded as (−16m, −2m), at time 00:00:02, "Player 1" position 1002 is recorded as (−16m, −3m) and at time 00:00:03, "Player 1" position 1004 is recorded as (−15m, −4m). The (x, y) position of "Player 1" is recorded after every further one second interval throughout the duration of the video recording. However, it will be appreciated that the (x, y) position of "Player 1" (as the participant of the sporting event) could be recorded at a different interval (such as every $\frac{1}{15}$th, $\frac{1}{30}$th or $\frac{1}{60}$th of a second, for example). In one embodiment, the position of each participant of the sporting event is recorded for each frame of the video recording. Note that, as with the start and end time of each recorded event during the sporting event (as shown in FIG. 8), a clock used to record the time at each recorded participant position is synchronised with a clock used for recording the elapsed time of the video recording.

In order to synchronise the participant position with the video recording, it is known to synchronise the clocks of the participant position stream and the video recording stream. In other words, it is known to start the participant position capturing at the same time as the video capturing. Alternatively, a user can manually adjust the participant position stream with the video recording stream so that the participant position stream synchronises with the video recording stream. This allows the participant tracking to align with the video recording of the training.

Both of these mechanisms have limitations. Firstly, the video recording stream and the participant position stream may be generated by different sources. This makes synchronising clocks impossible as they are recorded by different systems with different start times. Secondly, the manual synchronisation takes a lot of time to do. Therefore, it is desirable to automate the process of synchronisation alignment without the need for the position information and the video recording to be captured in synchronism. Embodiments of the disclosure entitled "Automated Synchronisation" will address this issue.

Continuing with the explanation of FIG. 10, in this example, each x position and y position is recorded in metres (m) with respect to the centre 1008 of the soccer pitch 1010, the centre 1008 forming the origin of the (x, y) coordinate system within which the position of "Player 1" is recorded. The "Player 1" positions 1000, 1002 and 1004 are illustrated on the soccer pitch 1010 in FIG. 10. Tracking and recording the (x, y) position of a soccer player on a soccer pitch as shown in FIG. 10 may be carried out using any method known in the art.

At each recorded position of "Player 1", the yaw, pitch and zoom of the virtual camera used by the video clip generator 710 to generate the cut-out may be adjusted on the basis of a mapping between the pitch coordinates (x, y) and the yaw, pitch and zoom so that "Player 1" is featured in the output cut-out image. Such a mapping may be carried out on the basis of any suitable technique known in the art. For example, the same technique as described above for the determination of the pan (yaw), pitch (tilt) and zoom of a real camera in response to the determination of the (x, y) position of a player on a soccer pitch can be used (although this time, of course, it is the yaw, pitch and zoom of a virtual camera which is determined). As mentioned above, the cut-out image is a zoomed-in, perspective corrected portion of the frames of the video recording, and thus produces an image which mimics that of a real camera following "Player 1".

It will be appreciated that, for a general sporting event, any method of periodically recording the position of participants of the sporting event can be used to generate a suitable cut-out image of a particular participant from a full view video recording of the sporting event. The requirement is that the recorded position can be mapped to a suitable yaw, pitch and zoom of the virtual camera so as to allow the participant of interest to be featured in the output cut-out image.

In embodiments of the present disclosure, the timeline elements 903 are selectable by a user via the user input element 716 so as to produce a video clip 910 generated from the video recording. Advantageously, this allows a user not only to view the occurrence of events using the timeline 902, but also to investigate in detail the events which have taken place and to, for example, confirm whether event records which occur over the same or over overlapping time periods (or even non-overlapping time periods in temporal proximity to each other) are indeed linked. The user input element 716 is any suitable element or device which allows a user to select a timeline element 903 displayed on the display device 900. For example, the user input element 716 may comprise a keyboard, mouse, trackpad, touchscreen or the like.

In FIG. 9, it can be seen that the timeline element 808E has been selected by the user. In response to the selection of the timeline element 808E by the user, the timeline generator 708 causes the timeline element 808E to be shown in a different colour than that of the non-selected timeline elements. The timeline element 808E is shown in a darker shade than the non-selected timeline elements in FIG. 9. By selecting the timeline element 808E, the video clip generator 710 generates a video clip 910 featuring "Player 2", "Player 2" being the identifier of the event record 808 associated with timeline element 808E.

The video clip 910 is generated on the basis of the start and end times of the event record 808 corresponding to timeline element 808E and a cut-out generated on the basis of each of the positions of "Player 2" during the time period between the start and end times of the event record 808. The positions of "Player 2" during the time period between the start and end times of the event record 808 are known from the participant tracking data for "Player 2".

Thus, in this example, upon selection of the timeline element 808E, the video clip generator 710 forms a first cut-out based on the recorded position of "Player 2" at the start time 00:11:12 of event record 808. The video clip 910 is then displayed as the first cut-out at the predetermined frame rate of the video recording until the time of the next recorded position of "Player 2" is reached, in which case the video clip generator 710 forms a second cut-out based on this next recorded position of "Player 2". The video clip is then displayed as the second cut-out at the predetermined frame rate of the video recording until the time of the next recorded position of "Player 2". This continues until the end time of event record 808.

Figure 11:
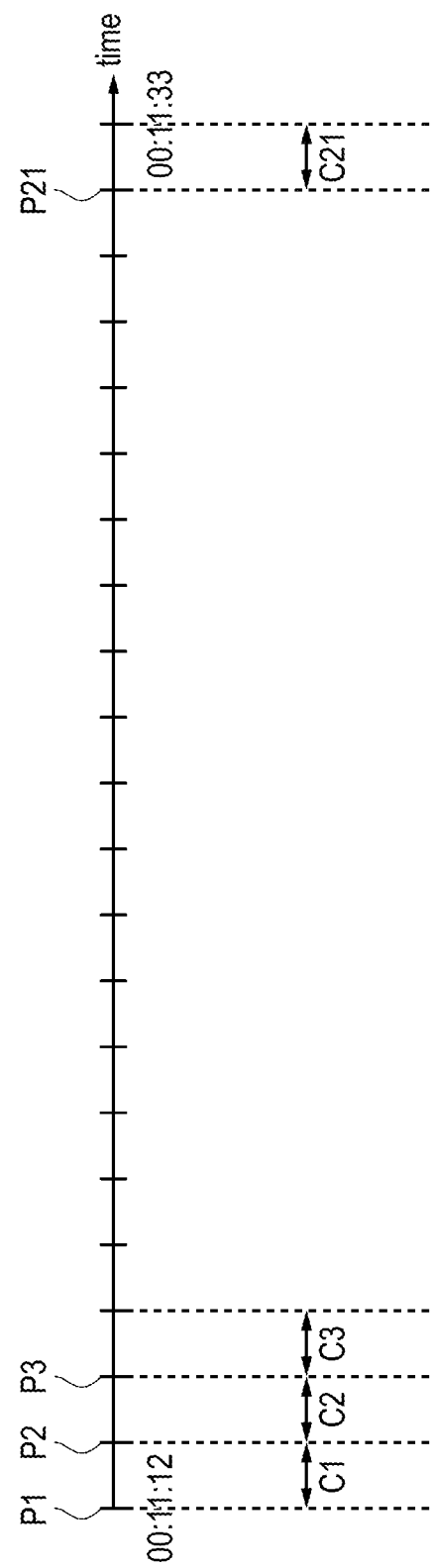
FIG. 11 shows a temporal relationship between participant position and cut-out selection according to an embodiment of the present disclosure.

This is illustrated in FIG. 11, in which, for simplicity, the position of "Player 2" between start time 00:11:12 and end time 00:11:33 is shown to be recorded every one second. At the start time 00:11:12, the position of "Player 2" is determined to be P1 and therefore the video clip is displayed as a cut-out C1 of the video recording generated on the basis of P1. One second later, at time 00:11:13, the position of "Player 2" is determined to be P2 and therefore the video clip is displayed as a cut-out C2 of the video recording generated on the basis of P2. One second later, at time 00:11:14, the position of "Player 2" is determined to be P3 and therefore the video clip is displayed as a cut-out C3 of the video recording generated on the basis of P3. The generation of the video clip then continues on this basis until the time 00:11:33 is reached, which marks the end of the video clip. The final cut-out displayed is (to continue with one second interval naming convention) cut-out C21 which is generated on the basis of "Player 2" position P22.

It will be appreciated that, in some embodiments, the starting point of an event record associated with a selected timeline element may not exactly coincide with the time of a participant position record. For example, the event record timing may be recorded more accurately and therefore the start time may be, for example, 00:11:12:13 (that is, 0 hours, 11 minutes, 12 seconds and 13 hundredths of a second) where as the position of "Player 2" may have only been recorded at, for example, 00:11:12:00 and 00:11:12:25. In this case, the most recent position of "Player 2" (that is, 00:11:12:00) may be used for generation of the cut-out at the start time. However, it will be appreciated that if the start and end times of an event are made to align with frames of the video recording, and if the position of "Player 2" (as a participant of the sporting event) is recorded for each frame of the video recording, then this problem will not arise. That is, the position of "Player 2" for the cut-out at the start time of the event record will be the position of "Player 2" in the frame of the video recording at the start time of the event record.

FIG. 9 shows the video clip 910 generated by the video clip generator 710. The video clip reveals that "Player 2"

912 has been penalised with a yellow card 915 by referee 914. This confirms to the user that the time overlap of the "Player 2" event record 808 and the "Yellow Card" event record 810 as identified by the relative positions of the corresponding timeline elements 808E and 810E on the timeline 902 was indicative of a true link of the events. The position of "Player 2" is indicated in the video clip by electronic identifier graphic 917.

In addition to the video clip 910, the video clip generator 710 also generates and outputs for display via the display output 714 an image of a plan view 911 of the soccer pitch 1010 in which the position of each of the soccer players is indicated. In this case, each soccer player is identified as either a white or black circle, the white or black colour indicating the soccer team to which the player belongs. Furthermore, the referee 915 of the soccer match is identified as a hashed circle. It will be appreciated that any shapes and/or colours may be used to indicate the soccer players and referee, to differentiate the soccer players belonging to different teams, and to differentiate the referee from the soccer players. The position of each player is identified on the basis of the participant tracking data for each player recorded between the start time and the end time of the event record associated with the selected timeline element 808E. In the plan view image 911, it can be seen that "Player 2" 912 is highlighted with an electronic highlight graphic 918 added by the video clip generator 710 (this may be added using video graphics techniques known in the art). This complements the electronic identifier graphic 917 in allowing the user to easily identify the position of "Player 2".

It is noted that, in other embodiments, the electronic identifier graphic 917 may be, for example, a ring drawn around the feet of "Player 2" rather than the name "Player 2" as shown in FIG. 9. This provides improved consistency between the electronic highlight graphic 918 (which identifies the position of "Player 2" in the play view image 911) and the electronic identifier graphic 917 (which identifies the position of "Player 2" in the video clip 910). It is also noted that the position of the electronic identifier graphic 917 in the video clip is generated on the basis of a mapping between each (x, y) coordinate of the soccer pitch in the plan view image 911 and a corresponding position of that coordinate on the portion of the soccer pitch shown in video clip 910 (this mapping being carried out using any suitable mapping technique on the basis of, for example, the yaw, pitch and zoom of the virtual camera). It will also be appreciated that other graphics could be added to both the video clip 910 and plan view image 911 using this mapping, so that when a graphic is drawn on the soccer pitch in video clip 910 a corresponding image will appear on the soccer pitch in the plan view image 911 (and vice versa). Further graphics could include arrows, shapes, etc. to help with sports coaching, for example, and can be added during an initial review of video clips using the timeline 902 or later on video clips saved for producing a presentation (see below).

When the timeline element 808E is selected, the video clip 910 and plan view image 911 are generated by the video clip generator 710 in the way described above and are played back as video images on the display device 900 between the start and ends times of the event record 808 associated with the selected timeline element 808. Thus, two separate views of the sporting event between the start and end times of the event record 808 are shown, one being the video clip 910 generated on the basis of successive cut-outs of the video recording so as to mimic a real camera following "Player 2" and the other being the plan view image 911 which allows the position of "Player 2" on the soccer pitch (and relative to the other soccer players) to be tracked. Thus, once a user has selected a particular timeline element 903, they are advantageously presented with a plurality of views by which to analyse the sporting event.

As will be explained with reference to FIGS. 13A-D, in addition to the cut-out image 910 and plan view image 911, it will be appreciated that further images could also be generated on the basis of the start and end times of the event record corresponding to the selected timeline element and/or the position of a participant identified by the event record. For example, the sporting event may have been captured by more than one camera, with each camera having a different field of view of the sporting event. Thus, there will be a plurality of video recordings, each from a different camera. In this case, a cut-out may be generated in the way described above for each of the video recordings, and thus a plurality of cut-out video clips of the participant identified by the selected event record may be produced. In this case, each cut-out video clip would appear to follow the participant from a different camera angle, thus providing the user with a multi-angled view of the participant concerned and allowing a full and detailed analysis of recorded events. In the case of multiple cut-out video clips, each video clip may be output for display simultaneously by the video clip generator 710 in a similar way to that in which the video clip 910 and plan view image 911 are simultaneously displayed in FIG. 9. Alternatively, each video clip may be displayed one at a time in response to selection via a suitable menu system or the like (as shown in FIGS. 13A-D).

Figure 12:
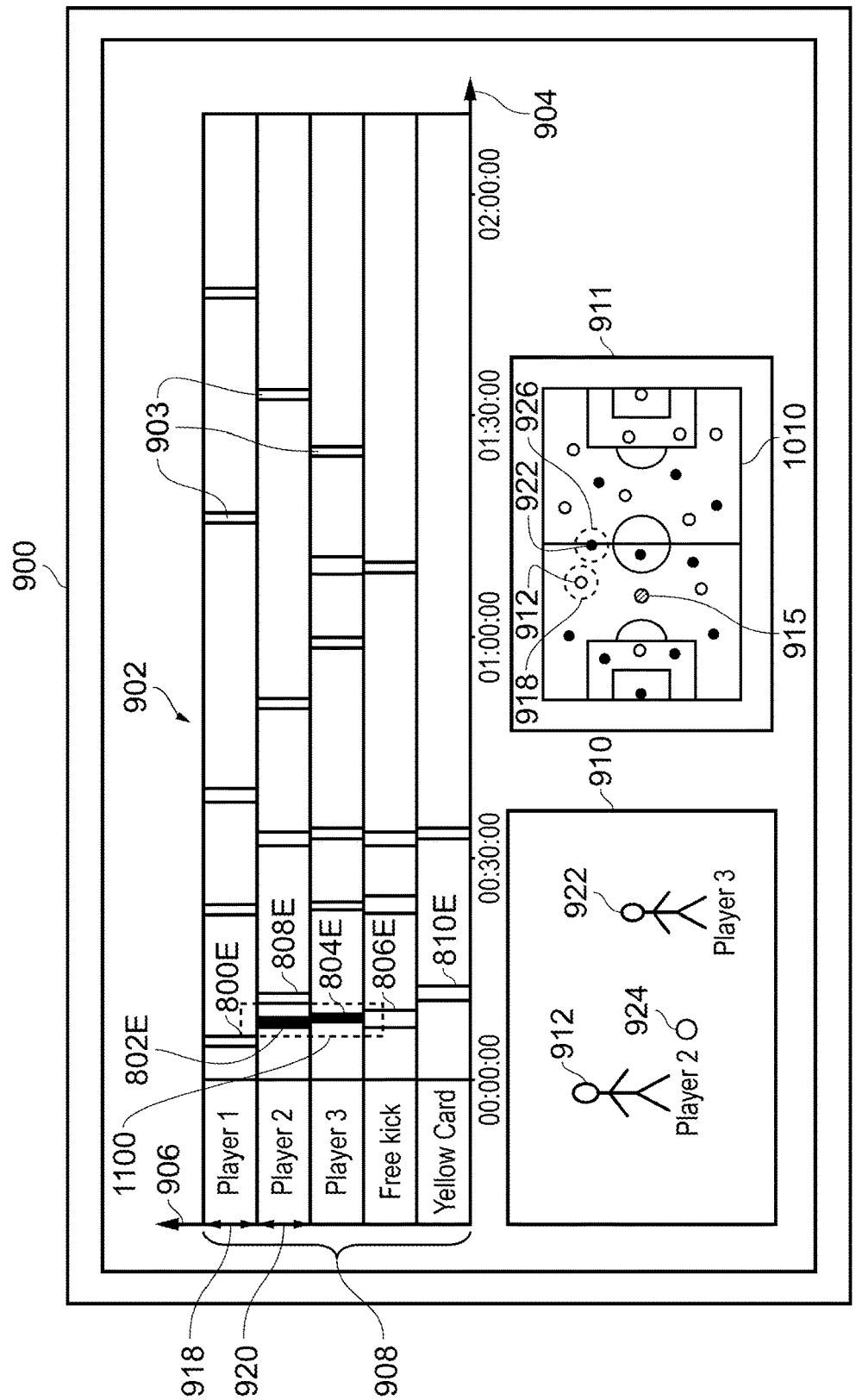
FIG. 12 shows a display device displaying a timeline according to an embodiment of the present disclosure in which a plurality of timeline elements have been simultaneously selected.

In the described embodiments, a user selects one of the timeline elements 903 displayed on the timeline 902. However, in another embodiment, a user may simultaneously select a plurality of timeline elements 903. This is illustrated in FIG. 12, in which the user has simultaneously selected timeline elements 802E and 804E (corresponding to event records 802 and 804, respectively). The user may select a plurality of timeline elements 903 by, for example, individually clicking (when the user input element 716 comprises a mouse, for example) or touching (when the user input element 716 comprises a touch screen, for example) each timeline element they wish to select. Alternatively, as shown in FIG. 12 for the selection of timeline elements 802E and 804E, the user may drag a box 1100 around the timeline elements they wish to select (again, using a dragging action with a mouse or with a touch screen).

When a plurality of timeline elements 903 have been selected, the video clip generator 710 generates the video clip 910 on the basis of the earliest start time of the event records corresponding to the selected timeline elements, the latest end time of the event records corresponding to the selected timeline elements, and the positions of each of the participants identified by the event records corresponding to the selected timeline elements (based on the participant tracking data for these participants). In particular, cut-outs of the video recording are generated based on a yaw, pitch and zoom of the virtual camera which allows all identified participants to be featured in each cut-out image. It is noted that, in some embodiments, the cut-out image associated with a single participant (following selection of a single timeline element, for example) may be expanded so as to include other participants (for which there is participant position data) manually by the user. For example, the user may be able to manually select participants to be included in the cut-out using a suitable menu system or the like (not shown).

In the example of FIG. 12, timeline elements 802E and 804E have been simultaneously selected. Thus, the video clip 910 is generated from the earliest start time of the corresponding event records 802 and 804 (this being 00:08:13, the start time of event record 802) to the latest end time of the corresponding event records (this being 00:08:49, the end time of event record 804). Furthermore, the yaw, pitch and zoom of the virtual camera is adjusted so that both "Player 2" (this being the participant identified by event record 802) and "Player 3" (this being the participant identified by event record 804) are featured in the cut-out images which form the video clip 910. Thus, in the video clip 910 in FIG. 12, both "Player 2" 912 and "Player 3" 922 are featured. In this case, it can be seen that both "Player 2" and "Player 3" are involved in a free kick (as indicated by the fact that the "Free Kick" event record 806 has a time overlap with the event record 802 for "Player 2" and the event record 804 for "Player 3") and that the soccer ball 924 featured in the video clip 910 is therefore stationary prior to being kicked. The plan view image 911 also indicates the respective positions of "Player 2" 912 and "Player 3" 922, with "Player 2" highlighted with highlight graphic 918 and "Player 3" highlighted with highlight graphic 926. Advantageously, this allows events involving multiple participants to be easily reviewed and analysed from the video recording of the sporting event.

It is noted that not all event records are suitable for generating a cut-out because they may not necessarily be associated with participant tracking data. In particular, this applies to event records which are not identified with a particular participant of the sporting event (for which there is the participant tracking data) but which are rather identified with an event such as a yellow card or free kick. For example, although, in some embodiments, when a player is penalised with a yellow card (thus resulting in a "Yellow Card" event record such as event record 810 being recorded), the (x, y) position on the soccer pitch 1010 at which the yellow card was held up by the referee may be recorded as tracking data, in other embodiments, there may be no tracking data (and therefore no position) associated with the yellow card. The same is true for when a free kick is awarded (thus resulting in a "Free Kick" event record such as event record 806 being recorded). In this case, it is not possible to automatically generate a cut-out from the video recording, since there is no position to be mapped to a corresponding yaw, pitch and zoom of the virtual camera.

Thus, following selection of a timeline element corresponding to an event record with an identifier for which there is no tracking data, the video clip 910 is generated between the start and end times of the event record but no cut-out is automatically generated. The video clip 910 therefore has the same full field of view as the original video recording. It is noted, however, that a cut-out of video clip 910 may still be generated manually by the user as the video clip 910 is played back. Manual generation of a cut-out is controlled via the user input element 716 in combination with a suitable user interface for allowing manual control of the virtual camera yaw, pitch and zoom. For example, the user may touch or click on a position of the soccer pitch 1010 shown in the plan view image 911, and the virtual camera yaw, pitch and zoom may be changed in response to the selection of this position (using the mapping between pitch position and camera yaw, pitch and zoom already discussed) so that the video clip shows a cut-out of the video recording. Thus, advantageously, even though a cut-out is not automatically generated (as occurs when a timeline element corresponding to an event record which identifies a participant is selected), a cut-out may still be manually generated by the user so as to allow the user to review and analyse the video clip 910 in more detail.

Although the above-described embodiments relate to generating cut-outs from a full view video recording of the sporting event, in other embodiments, one or more cameras each with a different respective view of the sporting event may be used instead of or in addition to the cameras used for capturing the full view of the sporting event. The view of the sporting event from each of these cameras may be a full view of the sporting event, or may instead be a partial view in which only a portion of the area of the scene in which the sporting event takes place (for example, a soccer pitch) and/or apportion of the participants of the sporting event (for example, all soccer players) are within the field of view. Any video recording camera view may be used as long as a mapping between positions of participants of the sporting event (e.g. (x, y) coordinates of a soccer pitch) and a yaw, pitch and zoom of the virtual camera for generating suitable cut-outs of the video recording can be established (as mentioned above). In embodiments, each camera used to capture a sporting event (whether with a full view or a partial view) will generate its own respective video recording of the sporting event which is stored in the storage unit 712.

FIGS. 13A-D schematically illustrate a further embodiment of the present disclosure in which a timeline may be generated and viewed for each of a plurality of video recordings of a sporting event captured from different cameras. In addition, a plurality of different video recordings may be generated and saved as part of a presentation which may be played back. These video recordings may be video recordings of the same sporting event captured by different cameras and/or video recordings of different sporting events, as will be explained. The presentation is generated by the controller 702 on the basis of output from the video clip generator 710 and saved in the storage unit 712. Each of FIGS. 13A-D show an interactive screen of the display device 900, each interactive screen being generated by the controller 702 on the basis of output from the timeline generator 708 and video clip generator 710 and being output by the display output element 714.

Figure 13A:
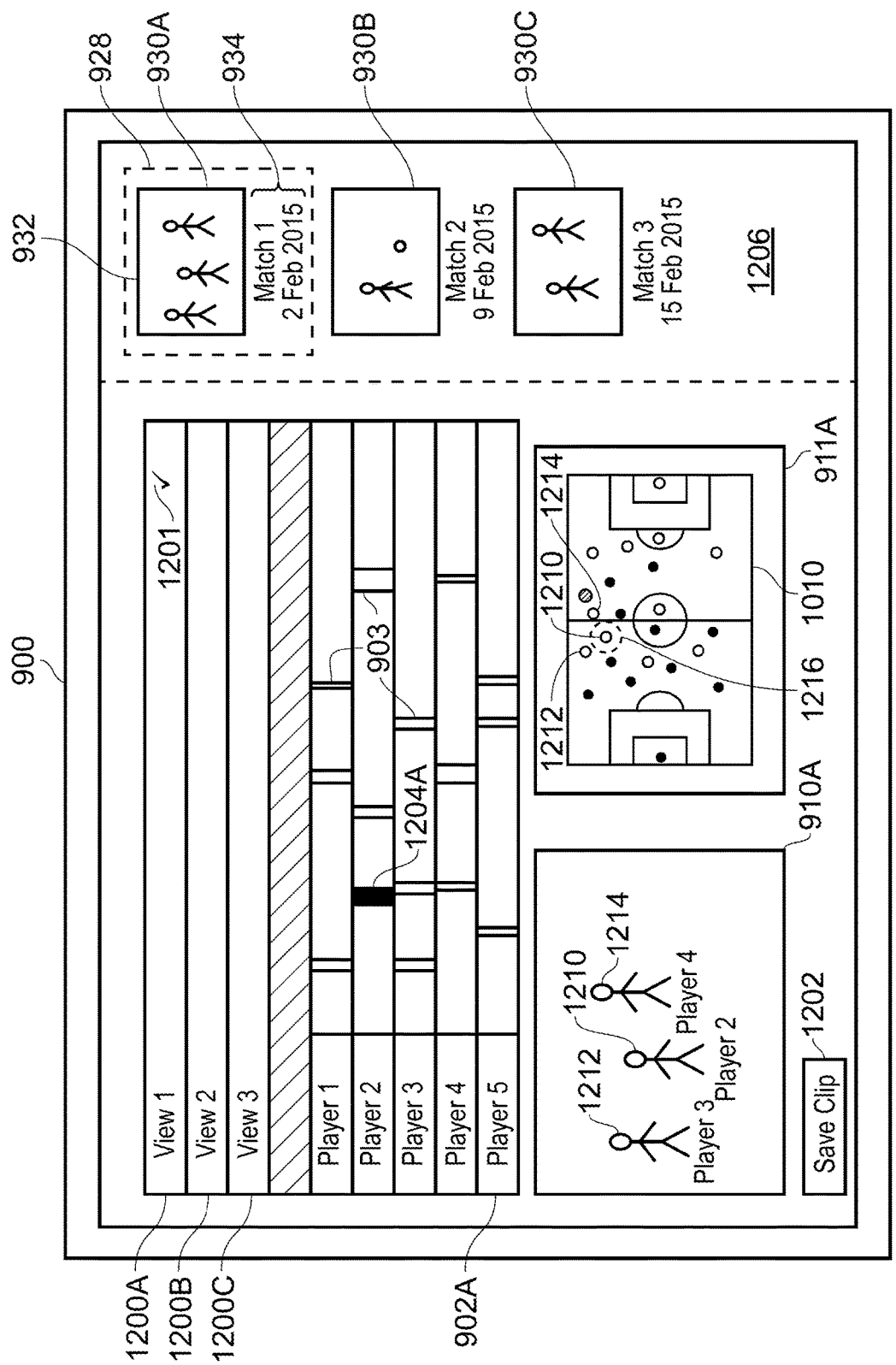
FIGS. 13A to 13D show a further embodiment of the present disclosure in which video clips from a plurality of different video recordings of sporting events may be generated and saved as part of a presentation.

FIG. 13A shows a first interactive screen. Three selectable bars 1200A, 1200B and 1200C are displayed, each representative of a video recording of the same sporting event captured from a different field of view. The three selectable bars 1200A, 1200B and 1200C thus form a list of different video recordings of a sporting event captured from a different field of view. In this example, each selectable bar is representative of a different camera view of a first soccer match ("Match 1"), with bar 1200A being representative of a first camera view ("View 1"), bar 1200B being representative of a second camera view ("View 2") and bar 1200C being representative of a third camera view ("View 3"). Each of the bars is selectable by the user (for example, the user may click or touch a bar in order to select it). In FIG. 13A, "View 1" has been selected by the user, as indicated by electronic identifier 1201. A timeline 902A relating to "Match 1" is generated and displayed. The timeline 902A is generated based on event records for "Match 1" received at the first receiver 704 in the way previously described.

The timeline 902A includes timeline elements 903 as previously described. In the example of FIG. 13A, the user has selected timeline element 1204A, which corresponds to an event record which identifies participant "Player 2". A first video clip 910A is therefore generated from the video recording associated with "View 1" on the basis of this selection in the way previously described. In particular, the first video clip 910A comprises cut-outs of "Player 2" derived from the video recording taken with first camera view "View 1" on the basis of participant tracking data of "Player 2" in "Match 1" received at the second receiver 706. The first video clip 910A temporally extends between the start time and end time of the event record associated with the selected timeline element 1204A. "Player 2" 1210 can be seen in the first video clip 910A of FIG. 13A, together with "Player 3" 1212 and "Player 4" 1214 ("Player 3" and "Player 4" happen to be featured in the virtual camera view forming the cut-out of "Player 2" in the video recording associated with "View 1" in this case). The position of "Player 2" 1210 is also indicated, on the basis of the participant tracking data of "Match 1", on the plan view image 911A of the soccer pitch 1010. The positions of "Player 3" 1212 and "Player 4" 1214 can also be seen. The position of "Player 2" is highlighted with a highlight graphic 1216, as previously described.

With timeline element 1204A still selected, the user may then select bar 1200B corresponding to second camera view "View 2". This is illustrated in the second interactive screen of FIG. 3B, in which the electronic indicator 1201 indicates that bar 1200B has been selected. A second video clip 910A' is therefore generated from the video recording associated with "View 2" on the basis of this selection in the way previously described. In particular, the second video clip 910A' comprises cut-outs of "Player 2" derived from the video recording taken with second camera view "View 2" on the basis of participant tracking data of "Player 2" in "Match 1" received at the second receiver 706. The second video clip 910A' temporally extends between the start time and end time of the event record associated with the selected timeline element 1204A. Second video clip 910A' is temporally the same as first video clip 910A, but is captured from a different field of view of the sporting event. Thus, "Player 2" 1210 can once again be seen in the second video clip 910A', but this time, "Player 2" 1210 is seen with "Player 5" 1220 and "Player 6" 1222 rather than with "Player 3" 1216 and "Player 4" 2114 because of the change in field of view (again. "Player 5" and "Player 6" happen to be featured in the virtual camera view forming the cut-out of "Player 2" in the video recording associated with "View 2" in this case). The position of "Player 2" 1210 is also indicated, on the basis of the participant tracking data of "Match 1", on the plan view image 911A of the soccer pitch 1010. The positions of "Player 5" 1220 and "Player 4" 1222 can also be seen. The position of "Player 2" is once again highlighted with a highlight graphic 1216, as previously described.

Finally, with timeline element 1204A still selected, the user may then select bar 1200C corresponding to third camera view "View 3". This is illustrated in the third interactive screen of FIG. 3C, in which the electronic indicator 1201 indicates that bar 1200C has been selected. A third video clip 910A" is therefore generated from the video recording associated with "View 3" on the basis of this selection in the way previously described. In particular, the third video clip 910A" comprises cut-outs of "Player 2" derived from the video recording taken with third camera view "View 3" on the basis of participant tracking data of "Player 2" in "Match 1" received at the second receiver 706. The third video clip 910A" temporally extends between the start time and end time of the event record associated with the selected timeline element 1204A. Third video clip 910A' is temporally the same as first video clip 910A and second video clip 910A', but is captured from yet another different field of view of the sporting event. Thus, "Player 2" 1210 can once again be seen in the second video clip 910A', but this time. "Player 2" 1210 is seen with "Player 6" 1222 and "Player 3" 1212 because of the change in field of view (again, "Player 6" and "Player 3" happen to be featured in the virtual camera view forming the cut-out of "Player 2" in the video recording associated with "View 3" in this case). The position of "Player 2" 1210 is also indicated, on the basis of the participant tracking data of "Match 1", on the plan view image 911A of the soccer pitch 1010. The positions of "Player 6" 1222 and "Player 3" 1212 can also be seen. The position of "Player 2" is once again highlighted with a highlight graphic 1216, as previously described.

In addition to being able to generate a timeline and video clips from different camera views of the same recorded sporting event, the user can also select a different recorded sporting event from which to generate a timeline and video clips from different camera views. In the embodiments of FIGS. 13A-D, each interactive screen comprises an event selection pane 1206 comprising a list of different sporting events. In this case, the list is in the form of an array of selectable elements 930A-C, each selectable element being representative of a different respective sporting event. In particular, selectable element 930A is representative of soccer match "Match 1" recorded on 2 Feb. 2015, selectable element 930B is representative of soccer match "Match 2" recorded on 9 Feb. 2015 and selectable element 930C is representative of soccer match "Match 3" recorded on 15 Feb. 2015. In this example, each selectable element 930A-C comprises a thumbnail image 932 which is, for example, a representation one frame of one of the video recordings of the sporting event associated with the selectable element, together with data 934 for helping to identify the sporting event (in this case, the data 934 including a name of the sporting event and the data on which it was recorded).

Figure 13B:
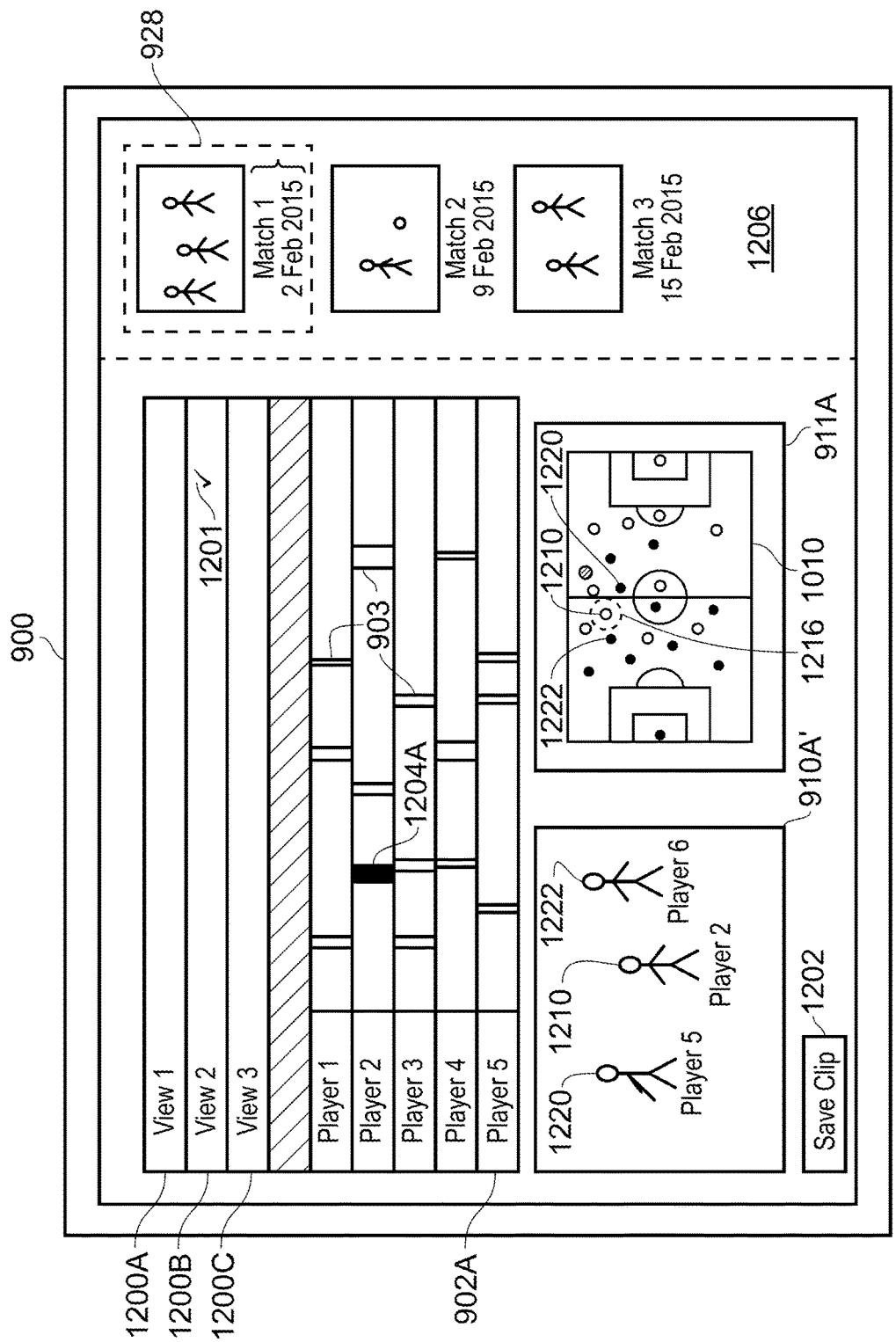
Figure 13C:
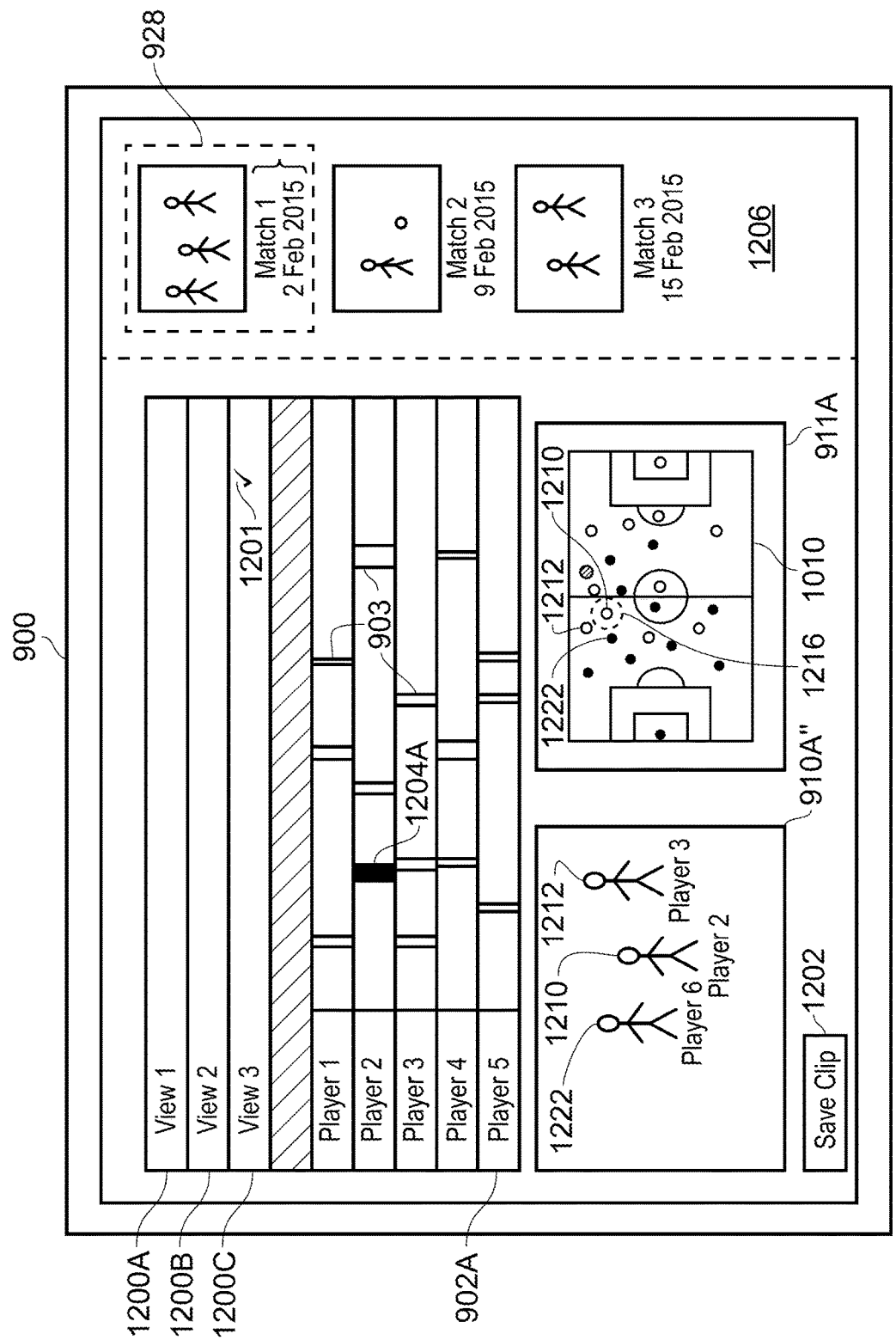

FIGS. 13A-C all relate to the sporting event "Match 1", which has been selected via its associated selection element 930A as indicated by electronic selection identifier 928. As shown in the fourth interactive screen of FIG. 3D, however, the user may then go onto select "Match 2" from the event selection pane 1206, as indicated by the electronic selection identifier 928 in FIG. 3D.

Figure 13D:
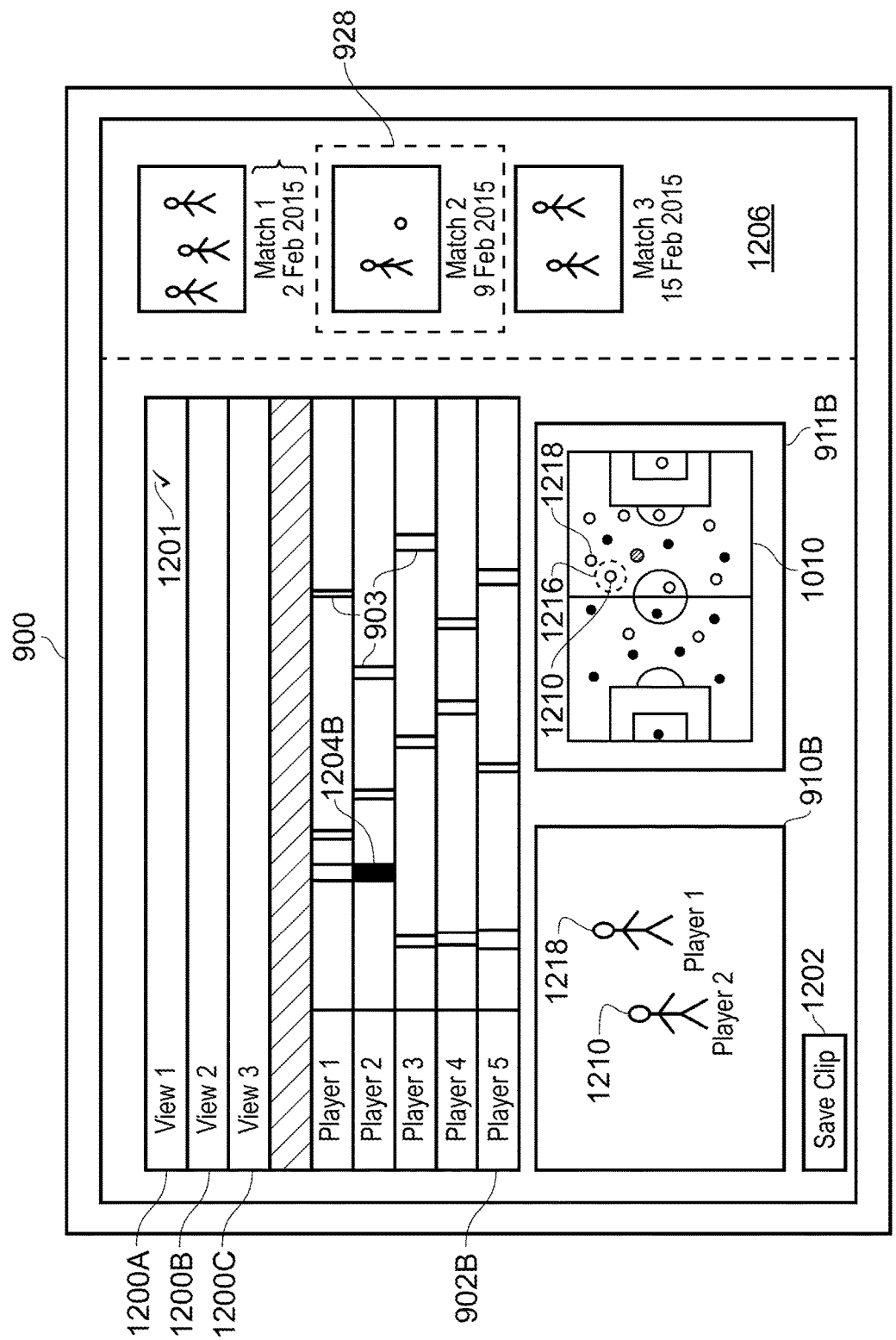

In response to the selection of "Match 2", a timeline 902B for event "Match 2" is generated and displayed. The timeline 902B is generated based on event records for "Match 2" received at the first receiver 704 in the way previously described. It will be appreciated that the timeline 902B will be different to the timeline 902A because it relates to a different sporting event ("Match 2" instead of "Match 1"). The timeline 902B includes timeline elements 903 as previously described. Each of the camera views are also once again available for selection via selection bars 1200A. 1200B and 1200C. In the example of FIG. 13D, the user has selected bar 1200A (corresponding to first camera view "View 1") and has selected timeline element 1204B, which corresponds to an event record which again identifies participant "Player 2". Note that this is the same participant "Player 2" as identified by the event record corresponding to the selected timeline element 1204A for "Match 1" in FIGS. 13A-C. The only difference is that "Player 2" is participating in "Match 2" instead of "Match 1" in this case. A fourth video clip 910B is therefore generated on the basis of the selection of timeline element 1204B in the way previously described. In particular, the video clip 910B comprises cut-outs of "Player 2" derived from the video recording of "Match 2" at first camera view ("View 1") on the basis of participant tracking data of "Player 2" in "Match 2" received at the second receiver 706. The fourth video clip 910B temporally extends between the start time and end time of the event record associated with the selected timeline element 1204B. "Player 2" 1210 can be seen in the fourth video clip 910B of FIG. 13D, together with "Player 1" 1218 ("Player 1" again happens to be featured in the virtual camera view forming the cut-out of "Player 2" in this case). The position of "Player 2" 1210 is also indicated, on the basis of the participant tracking data of "Match 2", on the plan view image 911B of the soccer pitch 1010. The position of "Player 1" 1218 can also be seen. The position of "Player 2" is again highlighted with a highlight graphic 1216, as previously described.

It will be appreciated that video clips generated on the basis of the selection of timeline element 1204B may be generated from the different video recordings of "Match 2" associated with the different camera views "View 1", "View 2" and "View 3" in response to user selection of the bars 1200A, 1200B and 1200C in the same way as described with respect to FIGS. 13A-C for "Match 1". It will also be appreciated that the camera views "View 1", "View 2" and "View 3" of each video recording of "Match 2" may be the same or may be different to the camera views "View 1", "View 2" and "View 3" in "Mach 1". This depends on the physical positioning and settings (for example, the pan, tilt and zoom) of each of the cameras used to captured a video recording of "Match 1" and "Match 2". The video recordings associated with each sporting event listed in the event selection pane 1206 are stored in the storage unit 712.

It will thus be appreciated that video clips may be generated on the basis of video recordings captured from different camera views of the same sporting event and/or on the basis of video recordings of different sporting events in an easy and intuitive manner using embodiments of the present disclosure.

In an embodiment of the present disclosure, there is a presentation mode in which one or more generated video clips can be saved as part of a presentation by a user selecting the "Save Clip" virtual button 1202 illustrated in FIGS. 13A-D (for example, the user may touch or click on the virtual button 1202). For example, if the user wishes to save the first video clip 910A shown in FIG. 13A as part of a presentation, then following the selection of timeline element 1204A, which causes the display of fist video clip 910A, the user selects virtual button 1202 and the first video 910A clip is saved to the storage device 712 as part of the presentation. Similarly, if the user then wishes to save the fourth video clip 910B shown in FIG. 13D as part of the presentation, then following the selection of timeline element 1204B, which causes the display of fourth video clip 910B, the user again selects virtual button 1202 and the fourth video clip 910B is saved to the storage device 712 as part of the presentation.

Thus, in the above-described manner, a user is able to select and save video clips from each of the recorded sporting events by selecting the selection element 930A, 930B or 930C corresponding to the desired sporting event, selecting a timeline element of the timeline generated for that recorded sporting event, selecting the bar 1200A, 1200B or 1200C corresponding to the desired camera view, and saving the video clip generated by selecting the virtual button 1202. Once the user is happy with the video clips saved for the presentation, the user may then save the presentation using, for example, a virtual button or the like (not shown).

For each video clip saved as part of the presentation, the original video recording of the sporting event from which the video clip is generated is saved in the storage unit 712 as a new electronic video file which temporally extends between the start time and the end time of the event record associated with the video clip. Information for identifying the one or more cut-outs from which the video clip is formed (for example, parameters indicating the yaw, pitch and zoom of the virtual camera for each cut-out, or even the participant position from which the yaw, pitch and zoom of the virtual camera for each cut-out is generated) is also saved in the storage unit 712 and is associated with or saved as part of the new electronic video file. Each new electronic video file of the presentation is furthermore associated with a presentation identifier for identifying the presentation saved in the storage unit 712. The presentation identifier may be determined by the user (for example, the user may be given the opportunity to enter a chosen name of the presentation using a keyboard or the like when the presentation is initially saved) or may be determined automatically.

Figure 14:
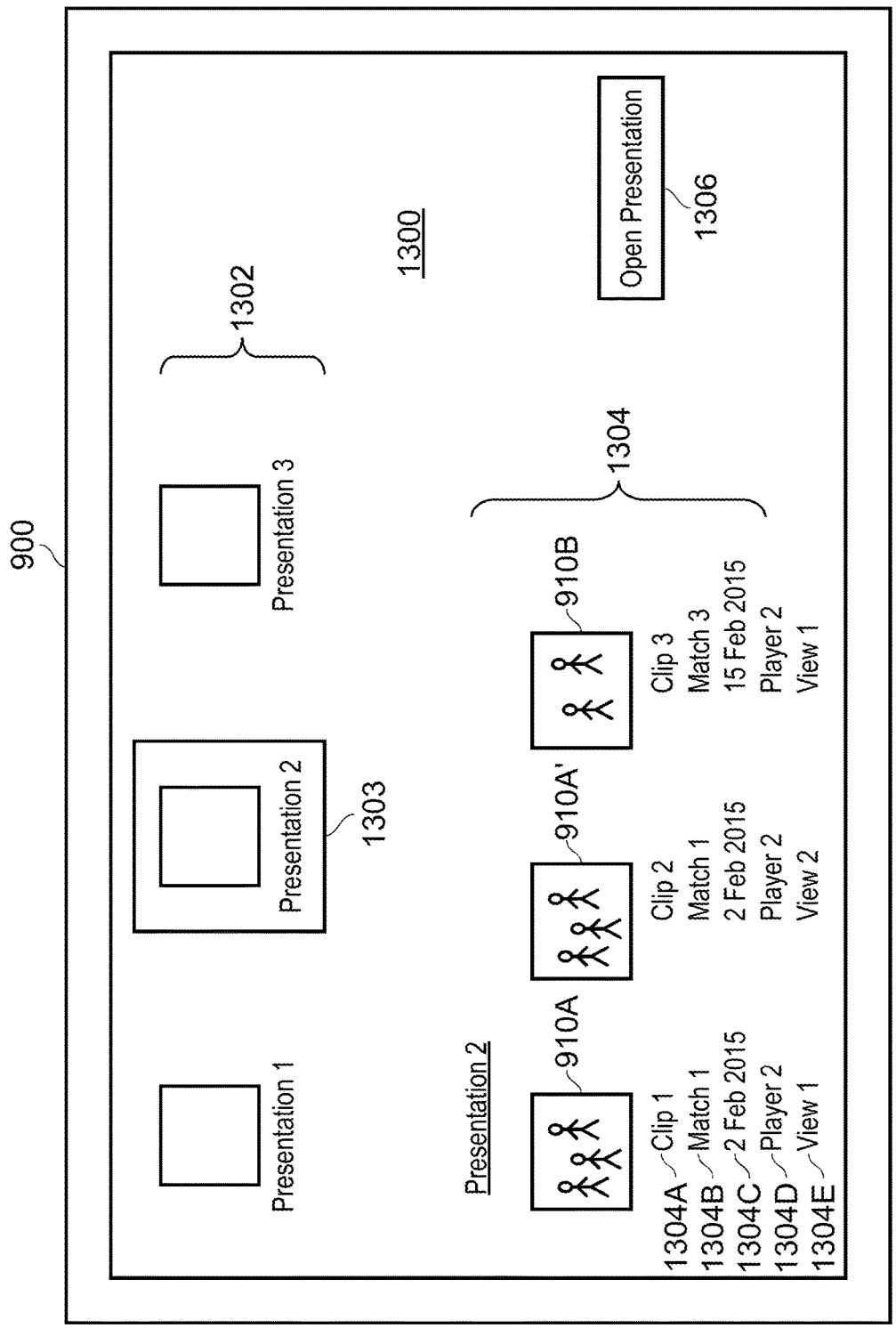
FIG. 14 shows a presentation selection screen according to an embodiment of the present disclosure.

When a presentation has been saved, it may be retrieved from the storage unit 712 via an interactive presentation selection screen generated by the controller 702 and output by the display output element 714 for display on the display device 900. An example of a presentation selection screen 1300, according to an embodiment, is illustrated in FIG. 14.

The presentation screen 1300 displays each of the saved presentations 1302. Each saved presentation may be selected by a user (for example, the user may touch or click on the presentation they wish to select). In the example of FIG. 14, the presentation named "Presentation 2" has been selected by the user. The selection is indicated by highlight graphic 1303. In this example, "Presentation 2" includes first video clip 910A of FIG. 13A, second video clip 910A' of FIG. 13B and fourth video clip 910B of FIG. 13D. In response to the selection of "Presentation 2", a preview 1304 of "Presentation 2" is shown. The preview shows each of the video clips from which "Presentation 2" is formed. It can be seen that "Presentation 2" includes video clips 910A, 910A' and 910B. Advantageously, the preview 1304 of "Presentation 2" allows the user to quickly review which video clips are included in the presentation and to therefore easily and accurately choose the correct presentation. As well as a thumbnail image of each of the video clips 910A, 910A' and 910B, further information about each video clip is also provided as part of the preview 1304. In this example, each video clip in the preview 1304 is displayed with information including the name of the video clip 1304A, the sporting event to which the video clip relates 1304B, the date of the sporting event 1304C, the identifier of the participant featured in the video clip 1304D and the camera view 1304E of the video clip.

In the case of "Presentation 2", the participant of each video clip is the same participant ("Player 2"), thus advantageously allowing the performance of this participant to be reviewed during recorded events over a plurality of different sporting events. In this case, "Player 2" is a soccer player, and therefore the performance of "Player 2" during a first event relating to video clips 910A and 910A' in "Match 1" and a second event relating to video clip 910B in "Match 2" may be reviewed using "Presentation 2".

Figure 15:
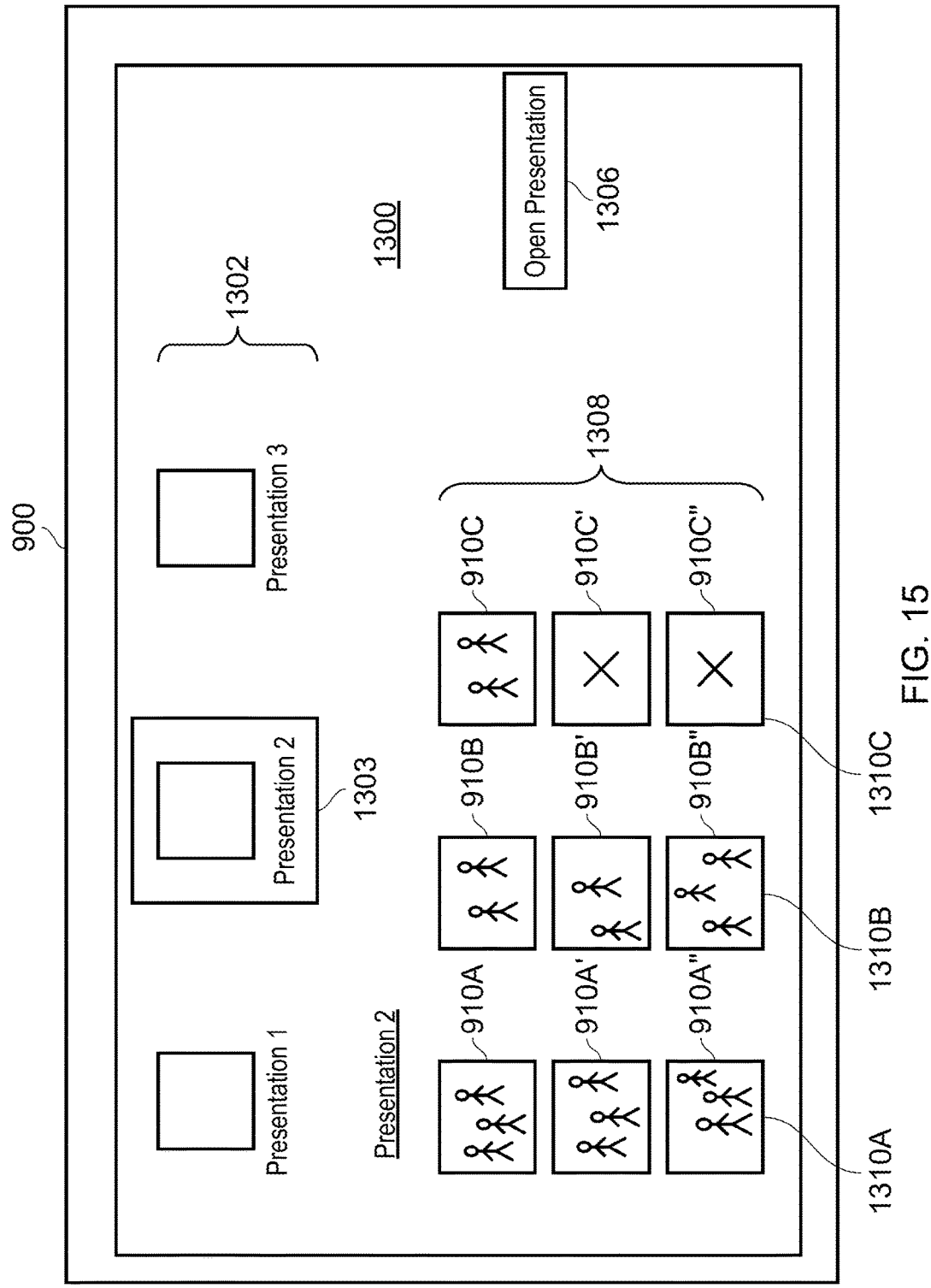
FIG. 15 shows a second presentation selection screen according to an embodiment of the present disclosure.

FIG. 15 shows the presentation screen of an alternative embodiment of the presentation mode. In this alternative embodiment, when a user selects to save a video clip generated on the basis of a particular selected timeline element (as described with reference to FIGS. 13A-D), a video clip generated from the video recording of each of the camera views is saved in the storage unit 712 as part of the presentation. Thus, for example, if the user were to select to save first video clip 910A generated from timeline element 1204, then second video clip 910A' and third video clip 910A" will also be saved. Advantageously, this allows a user to save all video clips associated with the same temporal event using a single operation. A saved presentation may then be presented as shown in FIG. 15.

The presentation screen of FIG. 15 is different to the presentation screen of FIG. 14 in that it comprises preview grid 1308 instead of linear preview 1304. Each column of the preview grid 1308 displays thumbnail images representing video clips corresponding to the same timeline element but captured from different camera views. The thumbnail images may be video or still images. In this example, column 1310A contains video clips 910A, 910A' and 910A" corresponding to timeline element 1204A (see FIGS. 13A-C) and column 1310B contains video clips 910B, 910B' and 910B" corresponding to timeline element 1204B. Unlike video clip 910B, video clips 910B' and 910B" are not shown in FIG. 13D. However, it will be appreciated that video clips 910B' and 910B" are video clips of the same temporal portion of recorded sporting event "Match 2" as that of video clip 910B but which have been captured from different respective camera views to that of video clip 910B, as has been explained. Column 1310C contains a single video clip 910C. In this case, however, video clip 910C has been generated from a further recorded sporting event (not shown in the Figures) for which only one video recording (from a single camera view) has been stored in the storage unit 712. Thus, the remaining portions 910C' and 910C" of column 1310C are shown to be blank in this case.

Advantageously, by saving every video clip associated with a selected timeline element and by presenting the saved video clips using the preview grid 1308 of FIG. 15, a user is able to quickly and conveniently see all the video clips captured with different camera views for a particular event in the presentation. Furthermore, a user may cause a desired video clip to be played back by selecting the relevant thumbnail of interest. For example, if the user wishes for video clip 910A to be played back, then they may select the thumbnail representing video clip 910A in the preview grid 1308 (using a touch or click operation via user interface element 716, for example) so as to initiate playback. Improved event analysis capability is thus provided to the user. It will be appreciated that, in another embodiment, each row (rather than each column) of the preview grid 1308 may display thumbnail images representing video clips corresponding to the same timeline element but captured from different camera views.

Once a presentation has been selected ("Presentation 2" in the case of FIGS. 14 and 15), the presentation may be opened by the user selecting the "Open Presentation" virtual button 1306. In response to this, the controller 702 causes each of the video clips in the presentation to be sequentially played back and output for display via the display output element 714. In the case of the embodiment of FIG. 15, each video clip representing the same event (for example, video clips 910A, 910A' and 910A") may be, for example, played back sequentially or, alternatively, played back simultaneously in different windows on the interactive screen. During the sequential playback of the video clips of the opened presentation, the presentation remains interactive. For example, the sequential playback of the video clips may be paused, rewound, fast forwarded, etc., graphics may be added to the video clips and the yaw, pitch and zoom of the virtual camera may be adjusted so as to change the cut-out (and therefore the perceived field of view) of each video clip as it is being played (each of these examples may be implemented with on screen controls or the like (not shown) which are selectable and controllable by the user).

Note that the latter example (adjustment of the yaw, pitch and zoom of the virtual camera during playback of each video clip) is possible because, for each video clip, it is a temporal portion of the original video recording of the sporting event from which that video clip is generated which is saved in the storage unit for the presentation (as mentioned above). The yaw, pitch and zoom of the virtual camera (which defines each cut-out of a video clip) may therefore be adjusted away from the yaw, pitch and zoom determined by the participant position, thus allowing to the user move the virtual camera around the recorded scene of the sporting event over the duration of each video clip. This provides enhanced interactive review and analysis capability of the video clips in the presentation. At the same time, because only a temporal portion of the full view original video recording is saved for each video clip in the presentation (rather than the entire length original video recording), storage space in the storage unit 712 is saved.

It is noted that a presentation of video clips in the way described above may be produced even when the video clips are generated using a method other than that which utilises the timeline. That is, a video clip of the full view video recording of a sporting event may be generated in any way which establishes a start time, an end time and a participant of the sporting event for which there is tracking data. The video clip may then be added to a presentation in the way described. In this case, the timeline generator 708 is not necessarily required, and instead, the user selects each of the start time, end time and participant of the sporting event (each participant still being identified with an identifier) either manually (using an appropriate user interface—not shown) or by selecting an event record from the raw data shown in FIG. 8, for example. The user selection in this case will occur via user input 716.

In embodiments, each video clip saved as part of a presentation is saved in the storage unit 712 as a new electronic video file which temporally extends between the start time and the end time of the event record associated with the video clip. However, in an alternative embodiment, the new electronic video file temporally extends from a first time which may precede the start time of the associated event record (for example, by a time corresponding to a predetermined number of frames of the relevant video recording) to a second time which may be subsequent to the end time of the associated event record (again, for example, by a time corresponding to a predetermined number of frames of the relevant video recording). Thus, in other words, the new electronic video file extends from a first time to a second time, and each of the start time and the end time of the associated event record are within the period defined between the first time and the second time. In addition, participant position data and/or virtual camera yaw, pitch and zoom data is saved for the time period between the first and second time so as to allow cut-out generation between the first and second time. In some embodiments, the same is true for the generation of a video clip following the selection of a timeline element 903. That is, the video clip is generated between a first time and a second time, and each of the start time and the end time of the event record associated with the video clip are within the period defined between the first time and the second time. The video clip generation includes cut-out generation based on participant position data and/or virtual camera yaw, pitch and zoom data for the time period between the first and second time. Advantageously, this provides greater flexibility to the user when generating video clips from the timeline and when reviewing saved video clips, allowing the user to review occurrences during the recorded sporting event which occurred before the start time of the relevant event record and after the end time of the relevant event record. It will be appreciated that, in some embodiments (including the embodiments described with reference to the Figures), the first time is equal to the start time of the relevant event record and the second time is equal to the end time of the relevant event record.

Figure 16:
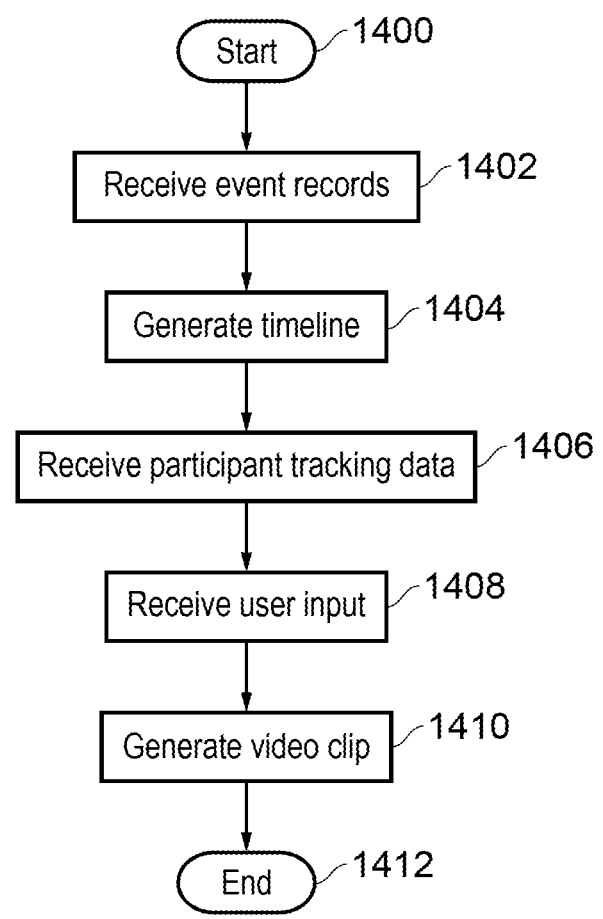
FIG. 16 shows a flowchart indicating a process of video clip generation according to an embodiment of the present disclosure.

A flowchart indicating a process of video clip generation according to an embodiment of the present disclosure is illustrated in FIG. 16.

The process starts at step 1400. At step 1402, receiver 704 receives a plurality of event records, each event record indicating a start time, an end time and an identifier of a participant of the sporting event. At step 1404, timeline generator 708 generates a timeline of the sporting event and outputs the timeline for display. The timeline indicates an elapsed time of the video recording of the sporting event along a first axis, the timeline indicates the identifier of the participant of the sporting event of each event record along a second axis, and the timeline comprises a plurality of timeline elements each corresponding to a respective event record, each timeline element extending along a portion of the first axis defined between the start time and the end time of its corresponding event record and each timeline element extending along a portion of the second axis associated with the identifier of the participant of the sporting event of its corresponding event record. At step 1406, receiver 706 receives participant tracking data indicative of a position of each participant of the sporting event identified by the identifier of one of the event records at each of a plurality of times during the elapsed time of the video recording of the sporting event. At step 1408, user input element 716 receives an input from a user to select one of the timeline elements when the timeline is displayed. At step 1410, video clip generator 710, in response to the user selection of one of the first timeline elements, generates a video clip from the video recording of the sporting event and outputs the video clip for display. The video clip is a portion of the video recording of the sporting event temporally extending between a first time and a second time, each of the start time and the end time of the first event record corresponding to the selected timeline element being within the period defined between the first time and the second time, and the video clip comprises one or more cut out portions of the video recording of the sporting event, each cut-out portion being generated on the basis of the participant tracking data of the participant of the sporting event identified by the identifier of the event record corresponding to the selected timeline element. The process then ends at step 1412.

Figure 17:
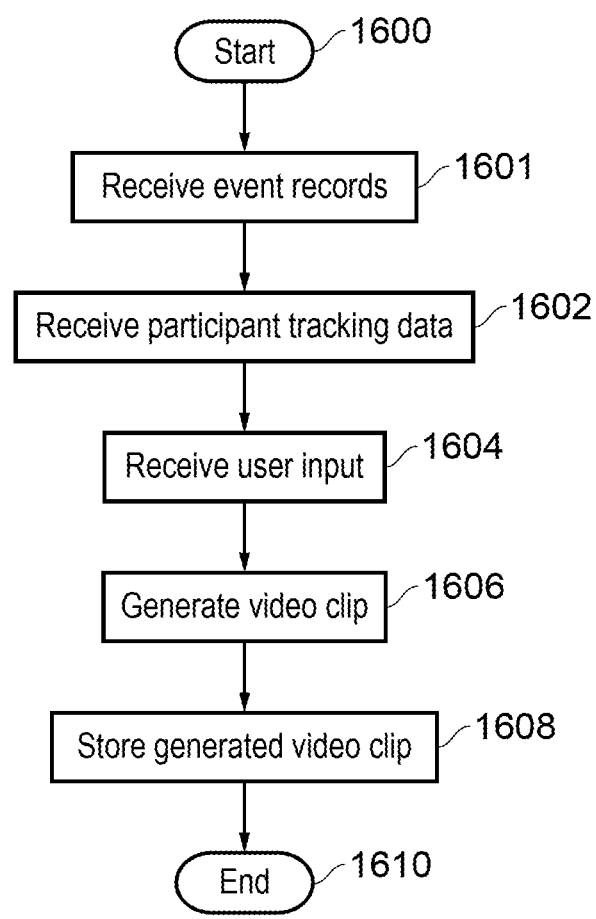
FIG. 17 shows a flowchart indicating a process of video clip presentation generation according to an embodiment of the present disclosure.

A flowchart indicating a process of video clip presentation generation according to an embodiment of the present disclosure is illustrated in FIG. 17.

The process starts at step 1600. At step 1601, receiver 704 receives a plurality of event records, each event record indicating a start time, an end time and an identifier of a participant of the sporting event. At step 1602, receiver 706 receives participant tracking data indicative of a position of each participant of the sporting event identified by the identifier of one of the event records at each of a plurality of times during an elapsed time of the video recording of the sporting event. At step 1604, user input element 716 receives an input from a user to select one of the event records. At step 1606, video clip generator 710, in response to the user selection of one of the event records, generates a video clip from the video recording of the sporting event. The video clip is a portion of the video recording of the sporting event temporally extending between a first time and a second time, each of the start time and the end time of the selected event record being within the period defined between the first time and the second time, and the video clip comprises one or more cut out portions of the video recording of the sporting event, each cut-out portion being generated on the basis of the participant tracking data of the participant of the sporting event identified by the identifier of the selected event record. At step 1608, the controller 702 stores the generated video clip as an electronic video file in the storage unit, the electronic video file comprising a portion of the video recording of the sporting event temporally extending between the first time and the second time, and the electronic video file being associated with the participant tracking data of the participant of the sporting event identified by the identifier of the selected event record and on which the generation of the one or more cut out portions of the video recording of the sporting event comprised within the video clip is based. The process then ends at step 1610.

Although the foregoing mentions a video clip, the present disclosure is not so limited. The video may be any kind of video stream, such as a video file for post-processing, or a live video which is processed in real-time, or a video captured by the user for example. The following should be interpreted accordingly.

Automated Synchronisation

As noted above, in embodiments of the present disclosure, it is advantageous to automatically synchronise the positional tracking stream with the video recording stream. In other words, as the positional information of each participant is not necessarily captured using the same system, or with the same start times as the video recording stream, it is desirable to ensure that these two streams are synchronised so that the sports analyst can correctly analyse the performance of each participant of interest.

Figure 18A:
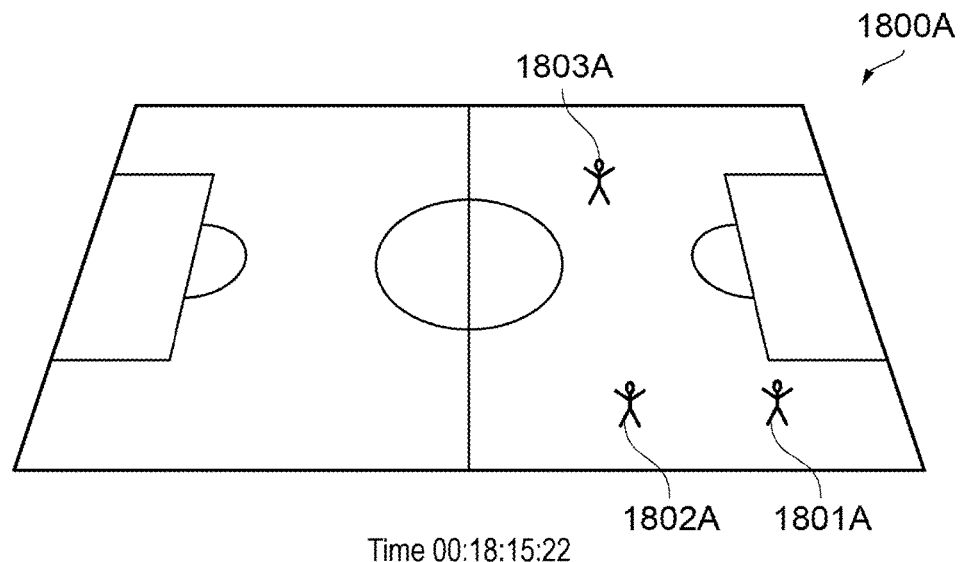
FIGS. 18A and 18B show a typical problem addressed by the present disclosure.
Figure 18B:
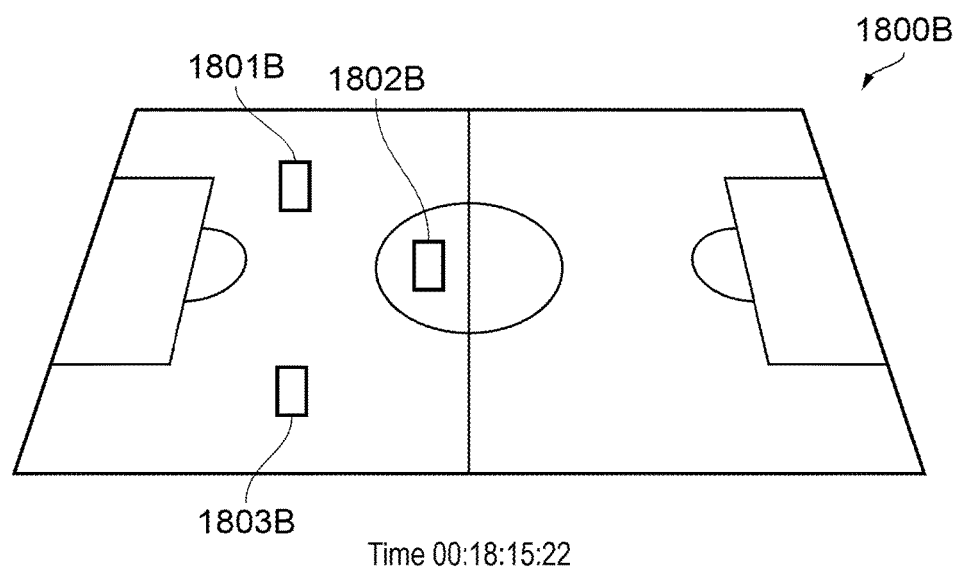

FIGS. 18A and 18B show a typical problem addressed by the present disclosure. In FIG. 18A, the video image at timecode 00:18:15:22 is shown. As can be seen in this Figure, three participants. 1801A-1803A are shown to be located on the right hand side of the pitch. However, at the same point in time (i.e. timecode 00:18:15:22) in the positional information stream shown in FIG. 18B, three players are located at a completely different part of the pitch. Specifically, in FIG. 18B, the position of three players 1801B-1803B at this time are located on the left hand side of the pitch. This means that any analysis of the positional information stream will not correspond to the video stream which may result in erroneous analysis.

The operation of the present disclosure will be shown with reference to FIGS. 19A to 19E, FIG. 20 and FIG. 21. The present disclosure will be performed, in embodiments, by the apparatus 700 of FIG. 7. Specifically, it is envisaged that the controller 705 will perform the embodiments of the disclosure.

Figure 19A:
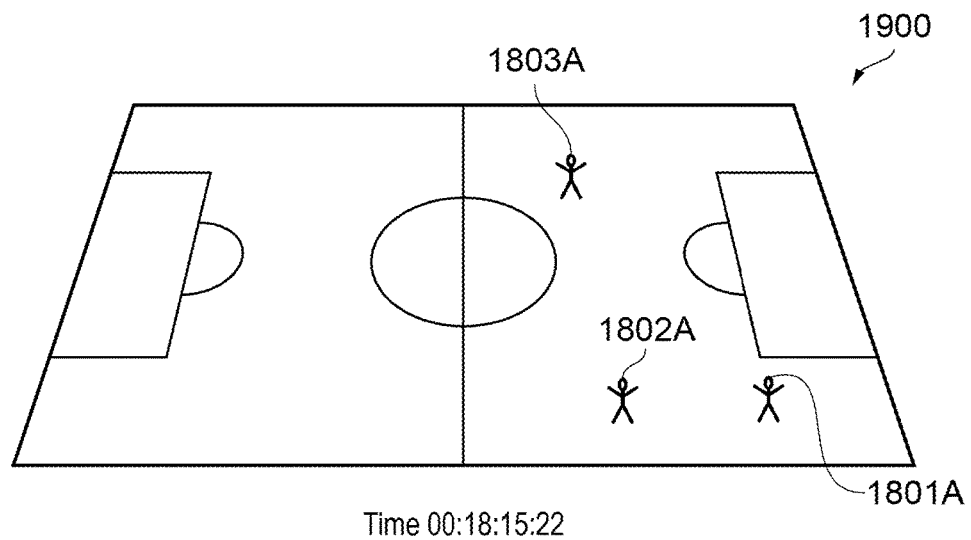
FIGS. 19A to 19E show a plan view explaining the operation of the present disclosure.
Figure 19B:
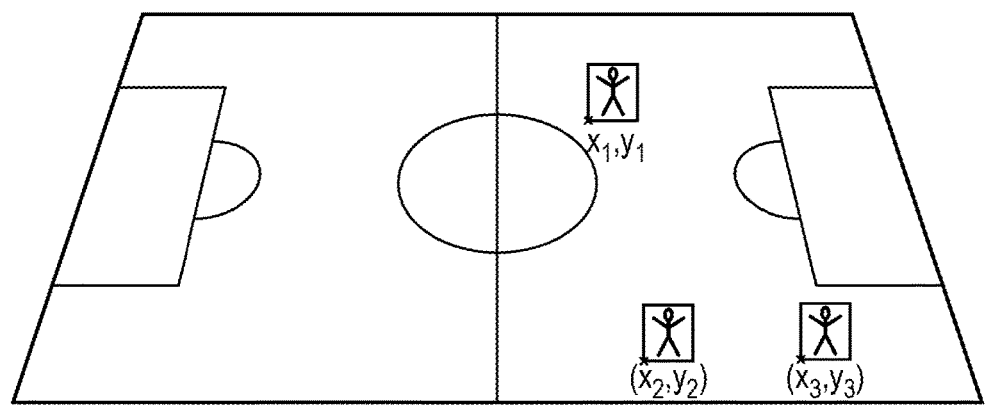

FIG. 19A shows FIG. 18A in more detail. A video frame from the video stream is shown in which pitch 1900 has player 1 1801A, player 2 1802A and player 3 1803A located thereon. In FIG. 19B, the user of the apparatus 700 selects these three players using a user interface, such as a mouse or touch screen or the like. As explained above, apparatus 700 maps the position of the three players located in the frame to their physical position on the pitch. Therefore, selected player 1 has a position of $(x_1, y_1)$ on the pitch; player 2 has a position of $(x_2, y_2)$ on the pitch; and player 3 has a position of $(x_3, y_3)$ on the pitch. The mechanism for mapping the position of the players from the captured image to the pitch is as described above with reference to FIG. 9. This is shown in FIG. 19B. In order for the user to realise they have selected a player, a box is drawn around each player as they are selected by the user.

Figure 19C:
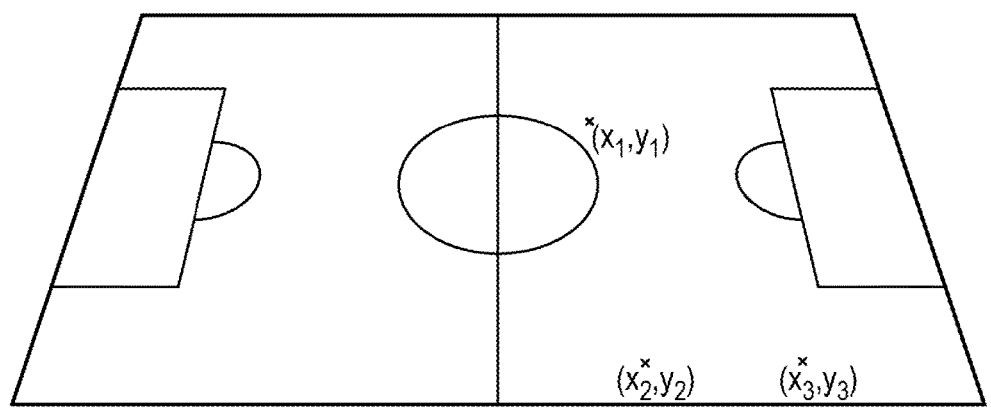

FIG. 19C shows the position on the pitch of each of the players extracted from the frame of the video stream. Of course, although selecting players is described, any type of object which moves from frame to frame may be selected. Further, although all the players in the frame are selected, only a proportion of players may be selected. Moreover, any number of players or objects may be selected, with three being selected for brevity. In fact, any number of objects may be selected, such as six.

Figure 19D:
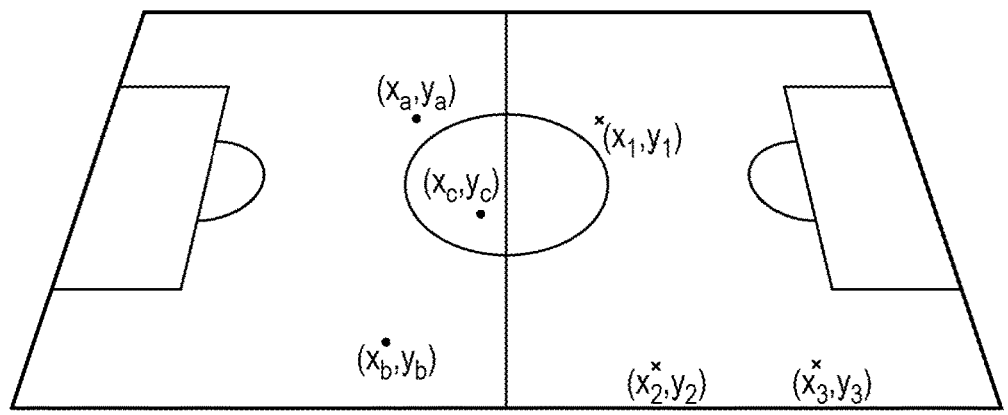

FIG. 19D shows the position on the pitch of each of the players extracted from the frame of the video stream and the position on the pitch of each of the players extracted from the positional tracking system at time 00:18:15:22. The position on the pitch of player 1' according to the position tracking system is $(x_a, y_a)$; the position on the pitch of player 2' according to the position tracking system is $(x_b, y_b)$; the position on the pitch of player 3' according to the position tracking system is $(x_c, y_c)$. It should be noted here that player 1', player 2' and player 3' in FIG. 19D may or may not be the same player as player 1, player 2 and player 3 of FIG. 19C respectively.

This shows the problem that is addressed by embodiments of the disclosure in that the video frame and the position information from the tracking system is not synchronised.

Figure 19E:
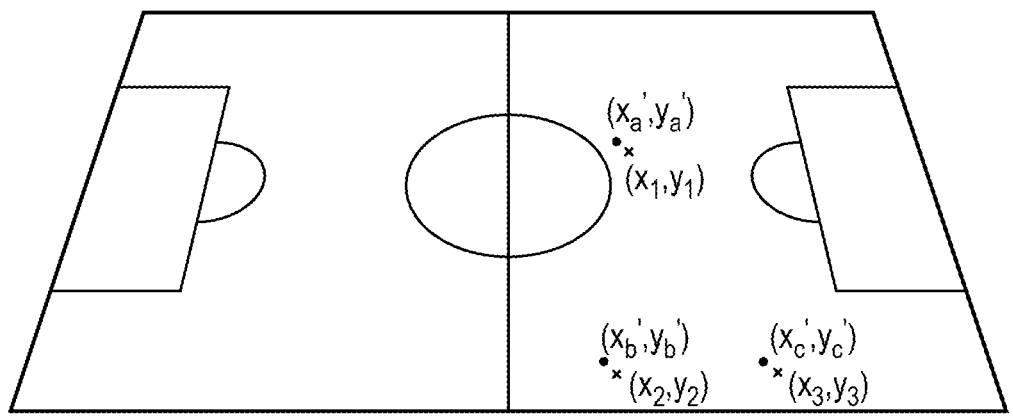

Referring to FIG. 19E, the position information from the tracking system at time 00:19:17:03 is shown overlaid on the position information established from the frame of the video stream at time 00:18:15:22. Specifically, at time 00:19:17:03, the position on the pitch of player 1 according to the position tracking system is $(x'_a, y'_a)$; the position on the pitch of player 2 according to the position tracking system is $(x'_b, y'_b)$; the position on the pitch of player 3 according to the position tracking system is $(x'_c, y'_c)$. Unlike the situation from FIG. 19D, it should be noted here that player 1, player 2 and player 3 in FIG. 19E are the same as player 1, player 2 and player 3 of FIG. 19C, respectively.

In other words, time 00:19:17:03 of the position tracking system corresponds to time 00:18:15:22 of the video stream. Therefore, it is possible to synchronise the stream of the position tracking system with the video stream. A mechanism for determining the time of the position tracking system which corresponds to a particular image from the video stream will now be described with reference to FIGS. 20 and 21.

Figure 20:
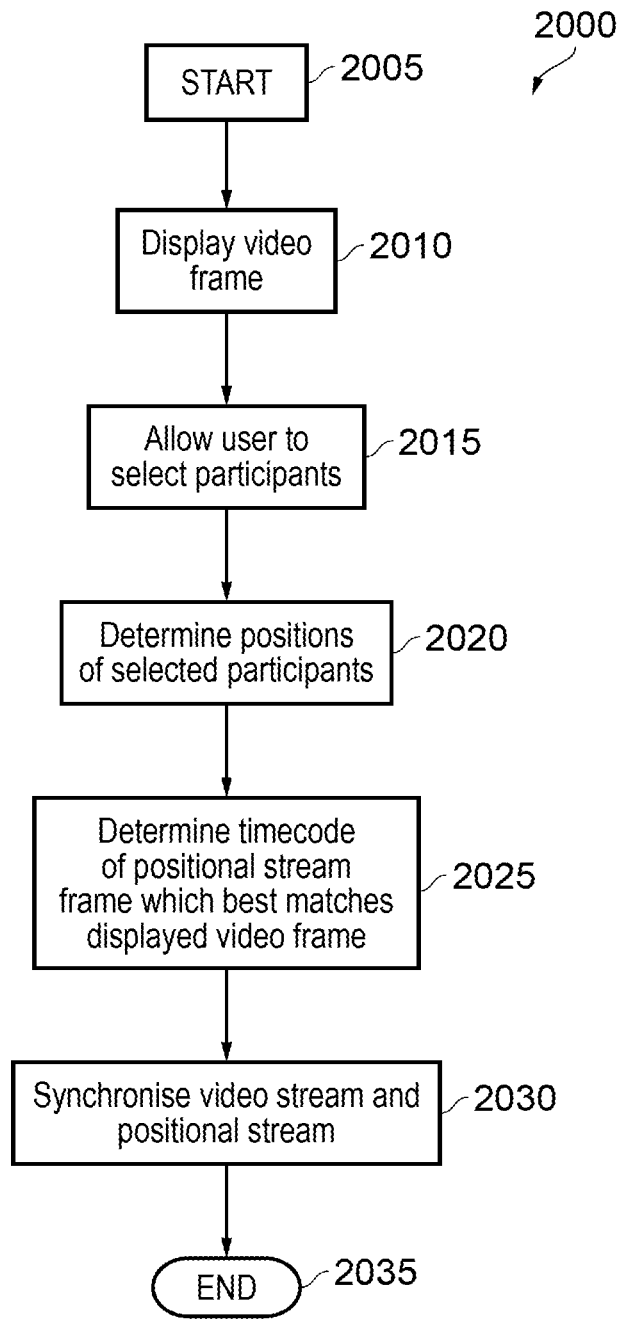
FIG. 20 shows a flowchart explaining the operation of embodiments of the present disclosure.

Referring to FIG. 20, a flow chart 2000 is shown. The flow chart starts at step 2005. In step 2010, a frame of the video stream is displayed. This frame may be selected at random, or when a certain number of objects are located in the frame. For example, a selection of video frames containing a predetermined number of players may be displayed to the user of the system. In a non-limiting example, the predetermined number may be the recommended (or minimum) number of objects or players required to synchronise the time of video stream to the time of the position information. The user can then select one of the predetermined frames.

The process then moves to step 2015 where the user is permitted to select one or more objects in the video frame. In embodiments, the user selects one or more participant (i.e. player) or other object in the image as shown in FIG. 19B.

The process then moves to step 2020 where the positions on the pitch of each of the selected participants or objects is determined.

The process then moves to step 2025 where the time or timecode of the positional information stream that best matches the displayed video frame is determined. This will be explained in detail with reference to FIG. 21. However, it will be appreciated after explanation of FIG. 21 that step 2025 effectively selects the timecode of the positional information whose pattern of positions best matches the positions determined from the video frame.

The process then moves to step 2030 where the video stream and the positional information stream are synchronised. In this step, the controller 702 of FIG. 7 synchronises the video stream with the positional information stream. This is achieved by adjusting the time code of the stream of positional information to correspond to the time code of the video stream. For example, in the above explanation of FIG. 19E, the time code of the stream of positional information is adjusted by 00:01:02:19 (which is the difference between 00:18:15:22 and 00:19:17:03). Therefore, the time code of the stream of positional information is synchronised to the time code of the stream of video frames.

The process then ends at step 2035.

In step 2030, it is possible that a plurality of time codes in the positional information stream are similar to the selected frame of video. This may occur when a low number of objects are selected from the video or if the number objects are in a particular location on the plane on multiple occasions during the video stream. One example of this latter point is at kick-off in a soccer match where the players are located at specific positions on the pitch. In this instance, the controller 705 may determine that multiple video frames are similar by displaying all frames that have the Euclidian distance between the position defined by the image and the position defined by the positional information as being below a threshold distance.

In this instance, the controller 705 may display a different video frame to the user in step 2010. Alternatively, the controller 705 may display all the video frames having the Euclidian distance below that threshold distance allowing the user to select a particular video frame.

Figure 21:
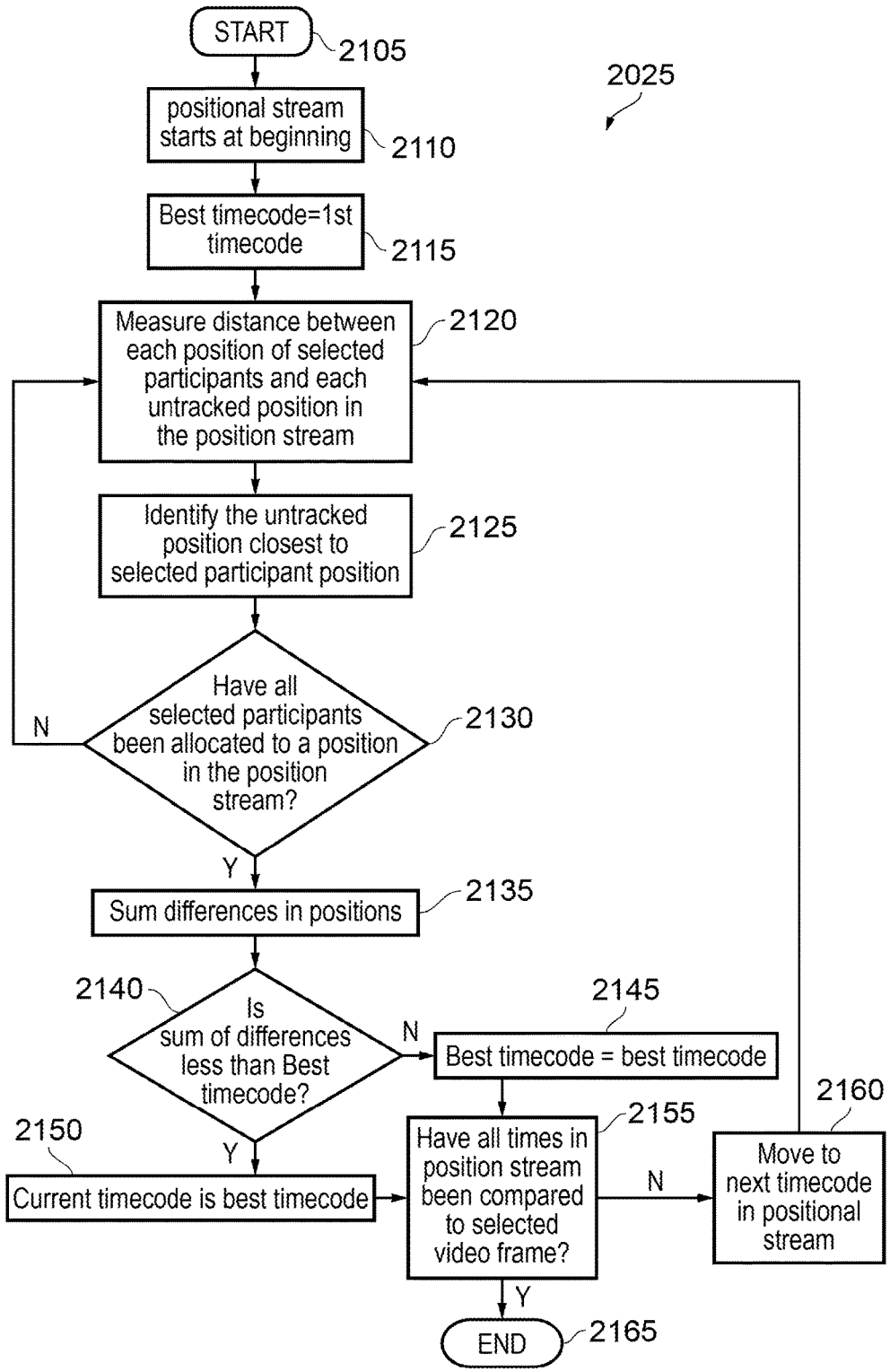
FIG. 21 shows a flowchart explaining the operation of step 2025 if FIG. 20 in more detail.

Referring to FIG. 21, the process described at step 2025 is described in more detail. Specifically, the process for determining the time at which the positional information best matches the displayed video to allow synchronisation will be described in FIG. 21.

The process starts at step 2105.

Having established the selected objects in the image in FIG. 20, and the position on the pitch of each of those selected objects on the pitch (or some other plane of view), the stream of positional information starts at a beginning point in step 2110. The beginning point may be the absolute beginning point (i.e, the absolute start of the positional information), or may be the start of a particular segment of an event. In this example, if it is known that the selected video frame exists in the second half of a soccer match, or the final quarter of an American Football game, then the beginning point may be the start of that half or quarter. By defining the beginning point as being the start of a particular segment of an event, the amount of processing required by the system is reduced.

After the beginning point has been found, the positional information at the time code (or time) of the beginning point is defined as the time code where the positional information of the object's position on the plane best matches the mapped position derived from the video frame. This provides a starting value for the best matched time code for the positional information and is performed at step 2115.

The position of each selected object is defined previously in step 2020 of FIG. 20. At each positional information time code, there will be several positions on the plane of interest defined. For example, in FIG. 19D at timecode 00:18:15:22, there are positions $(x_a, y_a)$, $(x_b, y_b)$ and $(x_c, y_c)$ defined by the position tracking system. In order to find the closest matched pattern, the Euclidian distance (i.e, the straight line distance) between the position of each of the selected participants and each, so-called, "untracked" position in the positional information from the position tracking system is found. The term "untracked position" will become apparent with the following description. However, in brief, when a position of a selected object is deemed to correspond to a position from the position tracking system, the position from the position tracking system is then tracked. Therefore, the term "untracked position" means a position in the positional information that does not correspond to a position of a selected object.

Therefore, in step 2120, and with reference to FIG. 19D, the Euclidian distance (i.e. straight line distance) between position $(x_1, y_1)$ and each of $(x_a, y_a)$, $(x_b, y_b)$, and $(x_c, y_c)$ is found. In step 2125, the position information from the position tracking system that has the smallest Euclidian distance is deemed to correspond to position $(x_1, y_1)$. So, in the example of FIG. 19D, position $(x_c, y_c)$ is closest to $(x_1, y_1)$ and so position $(x_c, y_c)$ corresponds to position $(x_1, y_1)$.

In step 2130, the process determines whether all selected objects in the selected video frame have been allocated to a corresponding position from the position tracking system. In the event that not all selected objects (which may be participants or objects in the selected image) have been allocated, the process returns to step 2120.

Continuing with reference to FIG. 19D, in the next iteration, process step 2120 moves to position $(x_2, y_2)$. The Euclidian distance between $(x_2, y_2)$ and each untracked position (i.e. $(x_a, y_a)$ and $(x_b, y_b)$) is determined and in step 2125, the position information from the position tracking system that has the smallest Euclidian distance is deemed to correspond to position $(x_2, y_2)$. So, in the example of FIG. 19D, position $(x_b, y_b)$ is closest to $(x_2, y_2)$ and so position $(x_b, y_b)$ corresponds to position $(x_2, y_2)$. As is evident, by comparing only untracked positions to each selected position, the computational requirements of the controller 705 are reduced and thus the speed at which the synchronisation can be achieved is reduced.

Returning to step 2130, in the event that each selected object position has been deemed to correspond to a position from the position tracking system, the "yes" path is followed and the process moves to step 2135. In step 2135, the defined differences in Euclidian distances are summed. This value provides a measure of the difference between the positions on the plane of interest (in one example, the soccer pitch) defined by the image and the positions on the plane of interest defined by the position information provided by the position tracking system. Of course, although summing the values provides a measure of the difference, other types of measure are envisaged such as mean average, median average or the like.

The process moves to step 2140 where the sum of the differences is compared to the sum of the differences for the defined best matched time. If the sum of the differences of the current time is greater than the previously defined best match time, then the "no" path is followed and the best matched time is unaltered at step 2145.

However, in the event that the sum of the differences of the current time is less than or even equal to the sum of the differences at the previously defined best match time, then the best match time is defined as the current time in step 2150.

After either step 2145 or step 2150 is followed, the process moves to step 2155 where the process determines if all time codes, or points in time of the position information stream from the position tracking system. If all time codes or points in time have been checked, the "yes" path is followed and the process moves to step 2165 where the process ends. Alternatively, if not all time codes have been checked, the "no" path is followed and the process moves to the next time code in step 2160. The process then returns to step 2120.

In the above, the "untracked" positions are compared with each selected position within the image. However, the disclosure is not so limited. Indeed, the Euclidian distance between each position from the position tracking system may be compared with each selected position from the selected frame of video. The correspondence between each selected position within the image and each selected position from the position tracking system will then be determined after each selected position has been compared with each position from the position tracking system.

After the best time code has been selected, as is shown for example in FIG. 19E, it is possible that there will still be some difference between the position defined by the image and the position defined by the position tracking system. This is shown in FIG. 19E, where the position of player 1 defined by the image is $(x_1, y_1)$ and the position of player 1 defined by the position tracking system is $(x'_a, y'_a)$.

It should also be noted here that a similar difference exists for player 2 and player 3. In other words, there is a slight difference between the position of player 2 and player 3 defined by the image and the position defined by the position tracking position. Specifically, with player 2, the position defined by the image is $(x_2, y_2)$ and the position defined by the position tracking system is $(x'_b, y'_b)$ and with player 3, the position defined by the image is $(x_3, y_3)$ and the position defined by the position tracking system is $(x'_c, y'_c)$.

It is possible to use this difference to ensure more accurate positioning of the objects on the plane of interest. In other words, it is possible to use this difference to produce a more accurate positioning of the players on the pitch using the image. As noted above, the position of each player is determined from yaw, pitch and zoom characteristics of the camera. As these characteristics are consistent for an image captured in embodiments, any error in this position can be corrected using an x and y offset value. The accuracy of the position may be improved by applying an x and y offset which will then be applied across all images in the video stream.

It is possible for the user to manually apply the offset. However, using the calculated differences between the position of the selected object in the image and the position of the object from the position tracking system, it is possible to automatically generate and apply the offset to all images in the video stream. Specifically, the mean average difference between the position of each player defined by the position tracking system and derived from the image may be calculated. The offset will be the mean average difference.

So, for example, referring to FIG. 19E, the following offset is calculated.

$$x \text{ offset} = \frac{(x'a - x1) + (x'b - x2) + (x'c - x3)}{3}$$

-continued $$y \text{ offset} = \frac{(y'a - y1) + (yb - y2) + (yc - y3)}{3}$$

Of course, the mean average is only an example and any kind of averaging is envisaged.

Although the above describes the image being selected and then the stream of position information being matched to that, the disclosure is not so limited. For example, it is possible that the position information of one time frame from the position tracking system is selected and the positions defined by the images be matched to that.

Although the above defines the minimum difference between the positions defined in the image and the position tracking system as corresponding (and so synchronising that image to a corresponding position from the position tracking system), the disclosure is not so limited. The effect of synchronising may be also achieved by defining a threshold minimum difference, and in the event that the difference is at or below that threshold, synchronising that image and corresponding position tracking system information.

Although the above describes the user selecting the image and the objects within the image, the disclosure is not so limited. For example, the controller 705 may automatically select either the image or the object(s) within the image. The image may be selected by performing object detection on the image to identify one or more objects within the image. The controller 705 may then select frames having at least a predetermined number of objects (for example, 3 objects). The controller 705 may also identify the position of each of these objects and select one or more frames where the position of one or more objects is in a particular position. For example, if one or more objects are located on the plane at a position having a low occurrence of the object, then this may be selected by the controller 705 as the likelihood of erroneously linking the frame to the positional information is reduced. Alternatively, or additionally, any other image characteristic such as the luminance or number of objects in the image may be used as a metric to select the image.

Within the selected image, one or more objects must be selected. This may be achieved by using chroma-keying. So, in the case of the soccer pitch, for example, only objects which are located on the pitch, but are not green may be selected. This will mean players on the pitch are selected.

Of course, any other type of image characteristic is envisaged. Moreover, the user may still select the image and/or the objects within an image but the controller may provide a shortlist of candidate images or objects.

In the event of automatically selecting the object positions, the system may apply an automatic verification of the alignment. In order to achieve this, after synchronisation of the video stream to the position information stream, the controller 705 selects an arbitrary video frame and measures the distance between the position of one or more of the objects on the plane defined by the video frame and the distance between the position of the object on the plane defined by the corresponding position information stream. If the position of the object on the plane defined by these two mechanisms differs by less than or equal to a predetermined threshold, then the alignment is verified. If, on the other hand, the position differs by greater than the predetermined threshold, then the alignment is not verified and the process defined in FIGS. 20 and 21 is re-run.

Typically, the frame rate of the video will match the frame rate of the object tracking information. In other words, the timing of video frames will match the timing of the object tracking information. This occurs when, for example, the system capturing the images in the video stream and capturing the object position information is the same.

Of course, it is envisaged that the frame rate of the video and the object tracking information may be different. In this situation, it is possible to determine the frame rate of the object tracking information. In order to achieve this, after synchronisation of the video stream to the object tracking information stream, two video frames a known number of frames apart may be selected. For example, two frames 100 frames apart may be selected. The corresponding object tracking information frames may then be selected and if the two object tracking frames are 100 frames apart, then the video frame rate and the object tracking information frame rate is the same. However, if the two object tracking frames are only 50 frames apart, the video frame rate is twice that of the object tracking information. Appropriate interpolation may then be applied to the video stream to ensure correct synchronisation of the images to the object tracking information. Although specific frame differences are provided herewith, any number of frames may be provided. Further, there may be a higher frame rate Although the foregoing describes selection of a video frame based on the number of objects on the plane, other criteria may be applied to the selection process. For example, if object detection is performed on the video stream, an identifier may be applied to each object within each video frame. In this case, if the identifiers are also applied to the positional information of the objects (for example, if the positional information for only a certain number of identified soccer players on the pitch is provided), then when an object is selected in the video frame, only time codes having positional information for that identified object will be reviewed. In the instance that a plurality of identified objects are selected by a user, then the number of video frames that require review is reduced. Respective features of embodiments of the present disclosure are defined by the following numbered clauses:

1. An information processing apparatus, comprising:
   receiver circuitry configured to receive i) a video stream comprising a plurality of images, each image containing at least one object located at a position in a plane and the image having associated image timing information indicating its temporal position in the video stream and ii) a stream of object tracking information each having associated object timing information indicating its temporal position in the stream of object tracking information wherein the stream of object tracking information corresponds to the video stream and separately defines the position of the object in the plane captured in each image in the video stream; and
   controller circuitry configured to perform pattern matching on the position of each of the objects in the video stream and the object tracking information, and when there is a closest matching position, synchronising the image timing information and the object timing information.

2. An information processing apparatus according to claim 1, wherein the controller circuitry is configured to perform pattern matching by selecting a plurality of objects on the plane and comparing the position of the selected objects in the video stream and the object tracking information, and when the difference in position is below a threshold, synchronising the image timing information and the object timing information.

3. An information processing apparatus according to claim 2, wherein the controller circuitry is configured to select an image from the image stream, to define the position of a plurality of objects in the image, and to compare those positions to the position of corresponding objects in each of the object tracking information, and whereby the synchronisation occurs when the difference in the compared positions is a minimum.

4. An information processing apparatus according to claim 3, wherein the controller circuitry is configured to compare the position of a first object selected in the image with each position in the object tracking information, and to link the closest position in the object tracking information to the first object selected in the image.

5. An information processing apparatus according to claim 4, wherein the controller circuitry is configured to compare the position of a second object selected in the image with each position in the object tracking information for which there is no link to the first object and to link the closest position in the object tracking information to the second object selected in the image.

6. An information processing apparatus according to any preceding claim, wherein the controller circuitry is configured to determine the difference in position between each object in the position tracking information and the corresponding video image and to calculate a horizontal and/or vertical offset on the basis of this difference, wherein the controller circuitry is configured to apply the calculated horizontal and/or vertical offset to a plurality of video images in the video stream.

7. An information processing apparatus according to any preceding claim, wherein the controller circuitry is configured to select at least one frame of video from the video stream based on an image characteristic of the video.

8. An information processing apparatus according to any preceding claim wherein the controller circuitry is configured to select a plurality of objects from the selected image based on an image characteristic of the object in the image.

9. An information processing apparatus according to claim 8, wherein the image characteristic is the chrominance on the object in the image.

10. An information processing apparatus according to any preceding claim, wherein the controller circuitry is further configured to: select a plurality of images from the video stream after synchronisation of the image timing information and the object timing information, the plurality of images being separated by a number of frames: select the object tracking information associated with the selected plurality of images; and determine any difference between the image timing information associated with the selected frames and the object timing information associated with the selected object tracking information.

11. An information processing apparatus according to any preceding claim, wherein the controller is further configured to: select an image from the video stream after synchronisation of the image timing information and the object timing information; compare the distance between the position of one or more of the objects on the plane in the selected image and the distance between the position of the object on the plane defined by the corresponding object tracking information; and verify the synchronisation on the basis of this comparison.

12. An information processing method, comprising:
receiving i) a video stream comprising a plurality of images, each image containing at least one object located at a position in a plane and the image having associated image timing information indicating its temporal position in the video stream and ii) a stream of object tracking information each having associated object timing information indicating its temporal position in the stream of object tracking information wherein the stream of object tracking information corresponds to the video stream and separately defines the position of the object in the plane captured in each image in the video stream; and
performing pattern matching on the position of each of the objects in the video stream and the object tracking information, and when there is a closest matching position, synchronising the image timing information and the object timing information.

13. An information processing method according to claim 12, comprising performing pattern matching by selecting a plurality of objects on the plane and comparing the position of the selected objects in the video stream and the object tracking information, and when the difference in position is below a threshold, synchronising the image timing information and the object timing information.

14. An information processing method according to claim 13, comprising selecting an image from the image stream, to define the position of a plurality of objects in the image, and comparing those positions to the position of corresponding objects in each of the object tracking information, and whereby the synchronisation occurs when the difference in the compared positions is a minimum.

15. An information processing method according to claim 14, comprising comparing the position of a first object selected in the image with each position in the object tracking information, and linking the closest position in the object tracking information to the first object selected in the image.

16. An information processing method according to claim 15, comprising comparing the position of a second object selected in the image with each position in the object tracking information for which there is no link to the first object; and linking the closest position in the object tracking information to the second object selected in the image.

17. An information processing method according to any one of claims 12 to 16, comprising determining the difference in position between each object in the position tracking information and the corresponding video image and to calculate a horizontal and/or vertical offset on the basis of this difference, and applying the calculated horizontal and/or vertical offset to a plurality of video images in the video stream.

18. An information processing method according to any one of claims 12 to 17, comprising selecting at least one frame of video from the video stream based on an image characteristic of the video.

19. An information processing method according to any one of claims 12 to 18 comprising selecting a plurality of objects from the selected image based on an image characteristic of the object in the image.

20. An information processing method according to claim 19, wherein the image characteristic is the chrominance on the object in the image.

21. An information processing method according to any one of claims 12 to 20, comprising selecting a plurality of images from the video stream after synchronisation of the image timing information and the object timing information, the plurality of images being separated by a number of frames; selecting the object tracking information associated with the selected plurality of images; and determining any difference between the image timing information associated with the selected frames and the object timing information associated with the selected object tracking information.

22. An information processing method according to any one claims 12 to 21, comprising selecting an image from the video stream after synchronisation of the image timing information and the object timing information; comparing the distance between the position of one or more of the objects on the plane in the selected image and the distance between the position of the object on the plane defined by the corresponding object tracking information; and verifying the synchronisation on the basis of this comparison.

23. A computer program product comprising computer readable instructions which when loaded onto a computer configures the computer to perform a method according to any one of claims 12 to 22.

24. An apparatus, method or computer program product as substantially herein described with reference to the accompanying drawings.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An information processing apparatus, comprising:
receiver circuitry configured to receive i) a video stream comprising a plurality of images, each image containing at least one object located at a position in a plane, and said each image having associated image timing information indicating a temporal position of said each image in the video stream and ii) a stream of frames of the object tracking information, each of the frames of the object tracking information having associated object timing information indicating a temporal position of said each of the frames of the object tracking information in the stream of the frames of the object tracking information, wherein at least part of the stream of the frames of the object tracking information is taken during a same time as at least part of the video stream, and wherein the stream of the frames of the object tracking information separately includes a numerical indication of the position in the plane of said at least one object captured in each image in the video stream, and wherein the numerical indication corresponds to position coordinates of the position in the plane; and
controller circuitry configured to perform pattern matching on the position in the plane of each of said at least one object in the video stream and the object tracking information, using the numerical indication, and when there is a closest matching position, identifying the closest matching position as a best match in time between the video stream and the object tracking information and synchronising the image timing information and the object timing information in accordance with the best match in time.

2. The information processing apparatus according to claim 1, wherein the controller circuitry is configured to perform pattern matching by selecting a plurality of objects on the plane and comparing the position in the plane of the selected objects in the video stream and the object tracking information, and when a difference in position is below a threshold, synchronising the image timing information and the object timing information.

3. The information processing apparatus according to claim 2, wherein the controller circuitry is configured to select an image from the video stream, to define the position of a plurality of objects in the image, and to compare those positions to the position of corresponding objects in each of the object tracking information, and whereby the synchronisation occurs when the difference in the compared positions is a minimum.

4. The information processing apparatus according to claim 3, wherein the controller circuitry is configured to compare the position of a first object selected in the image with each position in the object tracking information, and to link the closest matching position in the object tracking information to the first object selected in the image.

5. The information processing apparatus according to claim 4, wherein the controller circuitry is configured to compare the position of a second object selected in the image with each position in the object tracking information for which there is no link to the first object and to link the closest position in the object tracking information to the second object selected in the image.

6. The information processing apparatus according to claim 1, wherein the controller circuitry is configured to determine the difference in position between each object in the position tracking information and the corresponding video image and to calculate a horizontal and/or vertical offset on the basis of this difference, wherein the controller circuitry is configured to apply the calculated horizontal and/or vertical offset to a plurality of video images in the video stream.

7. The information processing apparatus according to claim 1, wherein the controller circuitry is configured to select at least one frame of video from the video stream based on an image characteristic of the at least one frame of video.

8. The information processing apparatus according to claim 3, wherein the controller circuitry is configured to select a plurality of objects from the selected image based on an image characteristic of the object in the selected image.

9. The information processing apparatus according to claim 8, wherein the image characteristic is a chrominance on the object in the image.

10. The information processing apparatus according to claim 1, wherein the controller circuitry is further configured to: select a plurality of images from the video stream after synchronisation of the image timing information and the object timing information, the plurality of images being separated by a number of frames; select the object tracking information associated with the selected plurality of images; and determine any difference between the image timing information associated with the selected plurality of images and the object timing information associated with the selected object tracking information.

11. The information processing apparatus according to claim 1, wherein the controller is further configured to: select an image from the video stream after the synchronisation of the image timing information and the object timing information; compare the distance between the position of one or more of the objects on the plane in the selected image and a distance between the position of the object on the plane defined by the corresponding object tracking information; and verify the synchronisation on the basis of this comparison.

12. An information processing method, comprising:
receiving i) a video stream comprising a plurality of images, each image containing at least one object located at a position in a plane, and said each image having associated image timing information indicating a temporal position of said each image in the video stream and ii) a stream of frames of object tracking information, each of the frames of the object tracking information having associated object timing information indicating a temporal position of said each of the frames of the object tracking information in the stream of the frames of the object tracking information, wherein at least part of the stream of the frames of the object tracking information is taken during a same time as at least part of the video stream, and wherein the stream of the frames of the object tracking information separately includes a numerical indication of the position in the plane of said at least one object captured in each image in the video stream, and wherein the numerical indication corresponds to position coordinates of the position in the plane; and
performing pattern matching on the position in the plane of each of said at least one object in the video stream and the object tracking information, using the numerical indication, and when there is a closest matching position, identifying the closest matching position as a best match in time between the video stream and the object tracking information and synchronising the image timing information and the object timing information in accordance with the best match in time.

13. The information processing method according to claim 12, comprising performing pattern matching by selecting a plurality of objects on the plane and comparing the position in the plane of the selected objects in the video stream and the object tracking information, and when a difference in position is below a threshold, synchronising the image timing information and the object timing information.

14. The information processing method according to claim 13, comprising selecting an image from the video stream, to define the position of a plurality of objects in the image, and comparing those positions to the position of corresponding objects in each of the object tracking information, and whereby the synchronisation occurs when the difference in the compared positions is a minimum.

15. The information processing method according to claim 14, comprising comparing the position of a first object selected in the image with each position in the object tracking information, and linking the closest matching position in the object tracking information to the first object selected in the image.

16. The information processing method according to claim 15, comprising comparing the position of a second object selected in the image with each position in the object tracking information for which there is no link to the first object; and linking the closest position in the object tracking information to the second object selected in the image.

17. The information processing method according to claim 12, comprising determining the difference in position between each object in the position tracking information and the corresponding video image and to calculate a horizontal and/or vertical offset on the basis of this difference, and applying the calculated horizontal and/or vertical offset to a plurality of video images in the video stream.

18. The information processing method according to claim 12, comprising selecting a plurality of images from the video stream after synchronisation of the image timing information and the object timing information, the plurality of images being separated by a number of frames; selecting the object tracking information associated with the selected plurality of images; and determining any difference between the image timing information associated with the selected frames and the object timing information associated with the selected object tracking information.

19. The information processing method according to claim 12, comprising selecting an image from the video stream after synchronisation of the image timing information and the object timing information; comparing the distance between the position of one or more of the objects on the plane in the selected image and the distance between the position of the object on the plane defined by the corresponding object tracking information; and verifying the synchronisation on the basis of this comparison.

20. A non-transitory computer-readable medium comprising computer readable instructions which when loaded onto a computer configures the computer to perform a method according to claim 12.

* * * * *